US009633442B2

(12) United States Patent
Venkataraman et al.

(10) Patent No.: US 9,633,442 B2
(45) Date of Patent: Apr. 25, 2017

(54) ARRAY CAMERAS INCLUDING AN ARRAY CAMERA MODULE AUGMENTED WITH A SEPARATE CAMERA

(71) Applicant: FotoNation Cayman Limited, San Jose, CA (US)

(72) Inventors: Kartik Venkataraman, San Jose, CA (US); Paul Gallagher, San Jose, CA (US); Ankit Jain, San Diego, CA (US); Semyon Nisenzon, Palo Alto, CA (US); Dan Lelescu, Morgan Hill, CA (US); Florian Ciurea, San Jose, CA (US); Gabriel Molina, Sunnyvale, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

(21) Appl. No.: 14/593,369

(22) Filed: Jan. 9, 2015

(65) Prior Publication Data

US 2015/0161798 A1    Jun. 11, 2015

Related U.S. Application Data

(63) Continuation-in-part of application No. 14/216,968, filed on Mar. 17, 2014.
(Continued)

(51) Int. Cl.
*G06T 7/00* (2006.01)
*G01P 3/38* (2006.01)
*H04N 13/02* (2006.01)

(52) U.S. Cl.
CPC ............. *G06T 7/0075* (2013.01); *G01P 3/38* (2013.01); *H04N 13/0242* (2013.01);
(Continued)

(58) Field of Classification Search
CPC .. G06T 7/0075; G06T 7/2093; H04N 13/0242
See application file for complete search history.

(56) References Cited

U.S. PATENT DOCUMENTS 4,124,798 A    11/1978   Thompson
4,198,646 A     4/1980   Alexander et al.
(Continued)

FOREIGN PATENT DOCUMENTS

EP          840502 A2    5/1998
EP         1201407 A2    5/2002
(Continued)

OTHER PUBLICATIONS

US 8,957,977, 02/2015, Venkataraman et al. (withdrawn)
(Continued)

*Primary Examiner* — Peter D Le
(74) *Attorney, Agent, or Firm* — KPPB LLP

(57) ABSTRACT

Systems with an array camera augmented with a conventional camera in accordance with embodiments of the invention are disclosed. In some embodiments, the array camera is used to capture a first set of image data of a scene and a conventional camera is used to capture a second set of image data for the scene. An object of interest is identified in the first set of image data. A first depth measurement for the object of interest is determined and compared to a predetermined threshold. If the first depth measurement is above the threshold, a second set of image data captured using the conventional camera is obtained. The object of interest is identified in the second set of image data and a second depth measurement for the object of interest is determined using at least a portion of the first set of image data and at least a portion of the second set of image data.

19 Claims, 10 Drawing Sheets

Related U.S. Application Data

(60) Provisional application No. 61/798,673, filed on Mar. 15, 2013, provisional application No. 62/003,015, filed on May 26, 2014.

(52) U.S. Cl.
CPC ............... *H04N 13/0271* (2013.01); *G06T 2207/10012* (2013.01); *G06T 2207/10021* (2013.01); *G06T 2207/10024* (2013.01); *H04N 13/0232* (2013.01)

(56) References Cited

U.S. PATENT DOCUMENTS

| | | | |
|---|---|---|---|
| 4,323,925 A | 4/1982 | Abell et al. | |
| 4,460,449 A | 7/1984 | Montalbano | |
| 4,467,365 A | 8/1984 | Murayama et al. | |
| 5,005,083 A | 4/1991 | Grage | |
| 5,070,414 A | 12/1991 | Tsutsumi | |
| 5,144,448 A | 9/1992 | Hornbaker | |
| 5,327,125 A | 7/1994 | Iwase et al. | |
| 5,629,524 A | 5/1997 | Stettner et al. | |
| 5,793,900 A * | 8/1998 | Nourbakhsh et al. | 382/263 |
| 5,808,350 A | 9/1998 | Jack et al. | |
| 5,832,312 A | 11/1998 | Rieger et al. | |
| 5,880,691 A | 3/1999 | Fossum et al. | |
| 5,933,190 A | 8/1999 | Dierickx et al. | |
| 5,973,844 A | 10/1999 | Burger | |
| 6,002,743 A | 12/1999 | Telymonde | |
| 6,005,607 A | 12/1999 | Uomori et al. | |
| 6,034,690 A | 3/2000 | Gallery et al. | |
| 6,069,351 A | 5/2000 | Mack | |
| 6,069,365 A | 5/2000 | Chow et al. | |
| 6,097,394 A | 8/2000 | Levoy et al. | |
| 6,124,974 A | 9/2000 | Burger | |
| 6,137,535 A | 10/2000 | Meyers | |
| 6,141,048 A | 10/2000 | Meyers | |
| 6,160,909 A | 12/2000 | Melen | |
| 6,163,414 A | 12/2000 | Kikuchi et al. | |
| 6,175,379 B1 | 1/2001 | Uomori et al. | |
| 6,205,241 B1 | 3/2001 | Melen | |
| 6,239,909 B1 | 5/2001 | Hayashi et al. | |
| 6,292,713 B1 * | 9/2001 | Jouppi et al. | 700/245 |
| 6,358,862 B1 | 3/2002 | Ireland et al. | |
| 6,477,260 B1 | 11/2002 | Shimomura | |
| 6,525,302 B2 | 2/2003 | Dowski, Jr. et al. | |
| 6,563,537 B1 | 5/2003 | Kawamura et al. | |
| 6,603,513 B1 | 8/2003 | Berezin | |
| 6,611,289 B1 | 8/2003 | Yu | |
| 6,627,896 B1 | 9/2003 | Hashimoto et al. | |
| 6,628,330 B1 | 9/2003 | Lin | |
| 6,635,941 B2 | 10/2003 | Suda | |
| 6,657,218 B2 | 12/2003 | Noda | |
| 6,671,399 B1 | 12/2003 | Berestov | |
| 6,750,904 B1 | 6/2004 | Lambert | |
| 6,765,617 B1 | 7/2004 | Tangen et al. | |
| 6,771,833 B1 | 8/2004 | Edgar | |
| 6,774,941 B1 | 8/2004 | Boisvert et al. | |
| 6,795,253 B2 | 9/2004 | Shinohara | |
| 6,801,653 B1 * | 10/2004 | Wu et al. | 382/154 |
| 6,819,358 B1 | 11/2004 | Kagle et al. | |
| 6,833,863 B1 | 12/2004 | Clemens | |
| 6,879,735 B1 | 4/2005 | Portniaguine et al. | |
| 6,903,770 B1 | 6/2005 | Kobayashi et al. | |
| 6,909,121 B2 | 6/2005 | Nishikawa | |
| 6,958,862 B1 | 10/2005 | Joseph | |
| 7,085,409 B2 | 8/2006 | Sawhney et al. | |
| 7,161,614 B1 | 1/2007 | Yamashita et al. | |
| 7,199,348 B2 | 4/2007 | Olsen et al. | |
| 7,262,799 B2 | 8/2007 | Suda | |
| 7,292,735 B2 | 11/2007 | Blake et al. | |
| 7,295,697 B1 | 11/2007 | Satoh | |
| 7,333,651 B1 * | 2/2008 | Kim et al. | 382/154 |
| 7,369,165 B2 | 5/2008 | Bosco et al. | |
| 7,391,572 B2 | 6/2008 | Jacobowitz et al. | |
| 7,408,725 B2 | 8/2008 | Sato | |
| 7,606,484 B1 | 10/2009 | Richards et al. | |
| 7,633,511 B2 | 12/2009 | Shum et al. | |
| 7,646,549 B2 | 1/2010 | Zalevsky et al. | |
| 7,657,090 B2 | 2/2010 | Omatsu et al. | |
| 7,675,080 B2 | 3/2010 | Boettiger | |
| 7,675,681 B2 | 3/2010 | Tomikawa et al. | |
| 7,706,634 B2 | 4/2010 | Schmitt et al. | |
| 7,723,662 B2 | 5/2010 | Levoy et al. | |
| 7,782,364 B2 | 8/2010 | Smith | |
| 7,840,067 B2 | 11/2010 | Shen et al. | |
| 7,912,673 B2 | 3/2011 | Hébert et al. | |
| 7,986,018 B2 | 7/2011 | Rennie | |
| 7,990,447 B2 | 8/2011 | Honda et al. | |
| 8,000,498 B2 | 8/2011 | Shih et al. | |
| 8,013,904 B2 | 9/2011 | Tan et al. | |
| 8,027,531 B2 | 9/2011 | Wilburn et al. | |
| 8,044,994 B2 | 10/2011 | Vetro et al. | |
| 8,077,245 B2 | 12/2011 | Adamo et al. | |
| 8,098,304 B2 | 1/2012 | Pinto et al. | |
| 8,106,949 B2 | 1/2012 | Tan et al. | |
| 8,126,279 B2 | 2/2012 | Marcellin et al. | |
| 8,130,120 B2 | 3/2012 | Kawabata et al. | |
| 8,131,097 B2 | 3/2012 | Lelescu et al. | |
| 8,164,629 B1 | 4/2012 | Zhang | |
| 8,180,145 B2 | 5/2012 | Wu et al. | |
| 8,189,089 B1 | 5/2012 | Georgiev et al. | |
| 8,212,914 B2 | 7/2012 | Chiu | |
| 8,213,711 B2 | 7/2012 | Tam | |
| 8,231,814 B2 | 7/2012 | Duparre | |
| 8,242,426 B2 | 8/2012 | Ward et al. | |
| 8,244,027 B2 | 8/2012 | Takahashi | |
| 8,254,668 B2 | 8/2012 | Mashitani et al. | |
| 8,279,325 B2 | 10/2012 | Pitts et al. | |
| 8,280,194 B2 | 10/2012 | Wong et al. | |
| 8,289,409 B2 | 10/2012 | Chang | |
| 8,294,099 B2 | 10/2012 | Blackwell, Jr. | |
| 8,305,456 B1 | 11/2012 | McMahon | |
| 8,315,476 B1 | 11/2012 | Georgiev et al. | |
| 8,345,144 B1 | 1/2013 | Georgiev et al. | |
| 8,360,574 B2 | 1/2013 | Ishak et al. | |
| 8,406,562 B2 | 3/2013 | Bassi et al. | |
| 8,446,492 B2 | 5/2013 | Nakano et al. | |
| 8,514,491 B2 | 8/2013 | Duparre | |
| 8,541,730 B2 | 9/2013 | Inuiya | |
| 8,542,933 B2 | 9/2013 | Venkataraman et al. | |
| 8,553,093 B2 | 10/2013 | Wong et al. | |
| 8,559,756 B2 | 10/2013 | Georgiev et al. | |
| 8,619,082 B1 | 12/2013 | Ciurea et al. | |
| 8,655,052 B2 | 2/2014 | Spooner et al. | |
| 8,682,107 B2 | 3/2014 | Yoon et al. | |
| 8,692,893 B2 | 4/2014 | McMahon | |
| 8,773,536 B1 | 7/2014 | Zhang | |
| 8,780,113 B1 | 7/2014 | Ciurea et al. | |
| 8,804,255 B2 | 8/2014 | Duparre | |
| 8,830,375 B2 | 9/2014 | Ludwig | |
| 8,831,367 B2 | 9/2014 | Venkataraman et al. | |
| 8,854,462 B2 | 10/2014 | Herbin et al. | |
| 8,861,089 B2 | 10/2014 | Duparre | |
| 8,866,920 B2 | 10/2014 | Venkataraman et al. | |
| 8,878,950 B2 | 11/2014 | Lelescu et al. | |
| 8,885,059 B1 | 11/2014 | Venkataraman et al. | |
| 8,896,594 B2 | 11/2014 | Xiong et al. | |
| 8,896,719 B1 | 11/2014 | Venkataraman et al. | |
| 8,902,321 B2 | 12/2014 | Venkataraman et al. | |
| 2001/0005225 A1 | 6/2001 | Clark et al. | |
| 2001/0019621 A1 | 9/2001 | Hanna et al. | |
| 2001/0038387 A1 | 11/2001 | Tomooka et al. | |
| 2002/0012056 A1 | 1/2002 | Trevino | |
| 2002/0027608 A1 | 3/2002 | Johnson | |
| 2002/0039438 A1 | 4/2002 | Mori et al. | |
| 2002/0063807 A1 | 5/2002 | Margulis | |
| 2002/0087403 A1 | 7/2002 | Meyers et al. | |
| 2002/0089596 A1 | 7/2002 | Suda | |
| 2002/0094027 A1 | 7/2002 | Sato et al. | |
| 2002/0101528 A1 | 8/2002 | Lee | |
| 2002/0113867 A1 | 8/2002 | Takigawa et al. | |
| 2002/0113888 A1 | 8/2002 | Sonoda et al. | |
| 2002/0163054 A1 | 11/2002 | Suda et al. | |

(56) References Cited

U.S. PATENT DOCUMENTS

| | | |
|---|---|---|
| 2002/0167537 A1 | 11/2002 | Trajkovic |
| 2002/0177054 A1 | 11/2002 | Saitoh et al. |
| 2002/0190991 A1* | 12/2002 | Efran et al. ............... 345/475 |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0066454 A1 | 4/2004 | Otani et al. |
| 2004/0075654 A1* | 4/2004 | Hsiao et al. ............... 345/418 |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler et al. |
| 2005/0225654 A1 | 10/2005 | Feldman et al. |
| 2005/0275946 A1 | 12/2005 | Choo et al. |
| 2005/0286612 A1 | 12/2005 | Takanashi |
| 2005/0286756 A1* | 12/2005 | Hong et al. ............... 382/154 |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0028476 A1* | 2/2006 | Sobel ............... 345/474 |
| 2006/0029270 A1* | 2/2006 | Berestov et al. ............ 382/154 |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam et al. |
| 2007/0030356 A1* | 2/2007 | Yea et al. ............... 348/207.99 |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0236595 A1* | 10/2007 | Pan et al. ............... 348/335 |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296835 A1 | 12/2007 | Olsen |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0112635 A1 | 5/2008 | Kondo et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |

(56) References Cited

U.S. PATENT DOCUMENTS

| | | |
|---|---|---|
| 2009/0128833 A1 | 5/2009 | Yahav |
| 2009/0129667 A1* | 5/2009 | Ho et al. ................ 382/154 |
| 2009/0167922 A1 | 7/2009 | Perlman et al. |
| 2009/0167923 A1 | 7/2009 | Safaee-Rad et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1* | 5/2010 | Nam et al. ................ 348/51 |
| 2010/0133230 A1 | 6/2010 | Henriksen et al. |
| 2010/0141802 A1 | 6/2010 | Knight et al. |
| 2010/0142839 A1 | 6/2010 | Lakus-becker |
| 2010/0157073 A1 | 6/2010 | Kondo et al. |
| 2010/0165152 A1 | 7/2010 | Lim |
| 2010/0171866 A1* | 7/2010 | Brady et al. ................ 348/340 |
| 2010/0177411 A1 | 7/2010 | Hegde et al. |
| 2010/0182406 A1* | 7/2010 | Benitez ................ 348/46 |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2011/0001037 A1 | 1/2011 | Tewinkle |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0115886 A1* | 5/2011 | Nguyen et al. ................ 348/47 |
| 2011/0121421 A1 | 5/2011 | Charbon et al. |
| 2011/0122308 A1 | 5/2011 | Duparre |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0255745 A1 | 10/2011 | Hodder et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1* | 11/2011 | McMahon ................ 348/302 |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim, II et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0062702 A1* | 3/2012 | Jiang et al. ................ 348/46 |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0163672 A1* | 6/2012 | McKinnon ................ 382/106 |
| 2012/0169433 A1* | 7/2012 | Mullins et al. ................ 333/181 |
| 2012/0170134 A1 | 7/2012 | Bolis et al. |
| 2012/0176479 A1 | 7/2012 | Mayhew et al. |
| 2012/0176481 A1* | 7/2012 | Lukk et al. ................ 348/47 |
| 2012/0188634 A1 | 7/2012 | Kubala et al. |
| 2012/0198677 A1 | 8/2012 | Duparre |
| 2012/0200734 A1 | 8/2012 | Tang |
| 2012/0206582 A1* | 8/2012 | DiCarlo et al. ................ 348/71 |
| 2012/0229628 A1 | 9/2012 | Ishiyama et al. |
| 2012/0237114 A1* | 9/2012 | Park et al. ................ 382/154 |
| 2012/0249550 A1 | 10/2012 | Akeley et al. |
| 2012/0249750 A1* | 10/2012 | Izzat et al. ................ 348/47 |
| 2012/0262607 A1 | 10/2012 | Shimura et al. |
| 2012/0287291 A1 | 11/2012 | Mcmahon et al. |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1* | 2/2013 | Li et al. ................ 348/51 |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0229540 A1 | 9/2013 | Farina et al. |
| 2013/0259317 A1 | 10/2013 | Gaddy |
| 2013/0265459 A1 | 10/2013 | Duparre et al. |

(56) References Cited

U.S. PATENT DOCUMENTS

| | | | |
|---|---|---|---|
| 2013/0274596 A1* | 10/2013 | Azizian et al. | 600/424 |
| 2014/0009586 A1 | 1/2014 | McNamer et al. | |
| 2014/0076336 A1 | 3/2014 | Clayton et al. | |
| 2014/0079336 A1 | 3/2014 | Venkataraman et al. | |
| 2014/0092281 A1 | 4/2014 | Nisenzon et al. | |
| 2014/0104490 A1 | 4/2014 | Hsieh et al. | |
| 2014/0118493 A1 | 5/2014 | Sali et al. | |
| 2014/0132810 A1 | 5/2014 | McMahon | |
| 2014/0176592 A1 | 6/2014 | Wilburn et al. | |
| 2014/0192154 A1* | 7/2014 | Jeong et al. | 348/43 |
| 2014/0192253 A1 | 7/2014 | Laroia | |
| 2014/0198188 A1 | 7/2014 | Izawa | |
| 2014/0218546 A1 | 8/2014 | Mcmahon | |
| 2014/0232822 A1 | 8/2014 | Venkataraman et al. | |
| 2014/0240528 A1 | 8/2014 | Venkataraman et al. | |
| 2014/0240529 A1 | 8/2014 | Venkataraman et al. | |
| 2014/0253738 A1 | 9/2014 | Mullis | |
| 2014/0267243 A1 | 9/2014 | Venkataraman et al. | |
| 2014/0267286 A1 | 9/2014 | Duparre | |
| 2014/0267633 A1 | 9/2014 | Venkataraman et al. | |
| 2014/0267762 A1 | 9/2014 | Mullis et al. | |
| 2014/0267890 A1 | 9/2014 | Lelescu et al. | |
| 2014/0285675 A1 | 9/2014 | Mullis | |
| 2014/0321712 A1 | 10/2014 | Ciurea et al. | |
| 2014/0333731 A1 | 11/2014 | Venkataraman et al. | |
| 2014/0333764 A1 | 11/2014 | Venkataraman et al. | |
| 2014/0333787 A1 | 11/2014 | Venkataraman et al. | |
| 2014/0340539 A1 | 11/2014 | Venkataraman et al. | |
| 2014/0347509 A1 | 11/2014 | Venkataraman et al. | |
| 2014/0354773 A1 | 12/2014 | Venkataraman et al. | |
| 2014/0354843 A1 | 12/2014 | Venkataraman et al. | |
| 2014/0354844 A1 | 12/2014 | Venkataraman et al. | |
| 2014/0354853 A1 | 12/2014 | Venkataraman et al. | |
| 2014/0354854 A1 | 12/2014 | Venkataraman et al. | |
| 2014/0354855 A1 | 12/2014 | Venkataraman et al. | |
| 2014/0355870 A1 | 12/2014 | Venkataraman et al. | |
| 2014/0368662 A1 | 12/2014 | Venkataraman et al. | |
| 2014/0368683 A1 | 12/2014 | Venkataraman et al. | |
| 2014/0368684 A1 | 12/2014 | Venkataraman et al. | |
| 2014/0368685 A1 | 12/2014 | Venkataraman et al. | |
| 2014/0368686 A1 | 12/2014 | Duparre | |
| 2014/0369612 A1 | 12/2014 | Venkataraman et al. | |
| 2014/0369615 A1 | 12/2014 | Venkataraman et al. | |
| 2014/0376825 A1 | 12/2014 | Venkataraman et al. | |
| 2014/0376826 A1 | 12/2014 | Venkataraman et al. | |
| 2015/0003752 A1 | 1/2015 | Venkataraman et al. | |
| 2015/0003753 A1 | 1/2015 | Venkataraman et al. | |
| 2015/0009353 A1 | 1/2015 | Venkataraman et al. | |
| 2015/0009354 A1 | 1/2015 | Venkataraman et al. | |
| 2015/0009362 A1 | 1/2015 | Venkataraman et al. | |
| 2015/0015669 A1 | 1/2015 | Venkataraman et al. | |
| 2015/0036014 A1 | 2/2015 | Lelescu et al. | |
| 2015/0036015 A1 | 2/2015 | Lelescu et al. | |
| 2015/0042766 A1 | 2/2015 | Ciurea et al. | |
| 2015/0042767 A1 | 2/2015 | Ciurea et al. | |
| 2015/0042833 A1 | 2/2015 | Lelescu et al. | |
| 2015/0049915 A1 | 2/2015 | Ciurea et al. | |
| 2015/0049916 A1 | 2/2015 | Ciurea et al. | |
| 2015/0049917 A1 | 2/2015 | Ciurea et al. | |
| 2015/0055884 A1 | 2/2015 | Venkataraman et al. | |

FOREIGN PATENT DOCUMENTS

| | | |
|---|---|---|
| EP | 2336816 A2 | 6/2011 |
| JP | 11142609 A | 5/1999 |
| JP | 11223708 A | 8/1999 |
| JP | 2002205310 A | 7/2002 |
| JP | 2003094445 A | 4/2003 |
| JP | 2005116022 A | 4/2005 |
| JP | 2005181460 A | 7/2005 |
| JP | 2006033493 A | 2/2006 |
| JP | 2006258930 A | 9/2006 |
| JP | 2007520107 A | 7/2007 |
| JP | 2008055908 A | 3/2008 |
| JP | 2009132010 A | 6/2009 |
| JP | 2011109484 A | 6/2011 |
| JP | 2013526801 A | 6/2013 |
| JP | 2014521117 A | 8/2014 |
| KR | 1020110097647 A | 8/2011 |
| WO | 2007083579 A1 | 7/2007 |
| WO | 2008108271 A1 | 9/2008 |
| WO | 2009151903 A2 | 12/2009 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |

OTHER PUBLICATIONS

US 8,964,053, 02/2015, Venkataraman et al. (withdrawn)
US 8,965,058, 02/2015, Venkataraman et al. (withdrawn)
Nguyen et al., Image-Based Rendering With Depth Information Using The Propagation Algorithm, 2005, IEEE, ICASSP, pp. 1-4.*
Extended European Search Report for European Application EP12835041.0, Report Completed Jan. 28, 2015, Mailed Feb. 4, 2015, 6 Pgs.
International Preliminary Report on Patentability for International Application No. PCT/US2012/059813, International Filing Date Oct. 11, 2012, Search Completed Apr. 15, 2014, 7 pgs.
International Preliminary Report on Patentability for International Application No. PCT/US2013/056065, Report Issued Feb. 24, 2015, Mailed Mar. 5, 2015, 4 Pgs.
International Preliminary Report on Patentability for International Application No. PCT/US2013/039155, report completed Nov. 4, 2014, Mailed Nov. 13, 2014, 10 Pgs.
International Preliminary Report on Patentability for International Application No. PCT/US2013/048772, Report issued Dec. 31, 2014, Mailed Jan. 8, 2015, 8 Pgs.
International Preliminary Report on Patentability for International Application No. PCT/US2013/056502, Report Issued Feb. 24, 2015, Mailed Mar. 5, 2015, 7 Pgs.
International Search Report and Written Opinion for International Application No. PCT/US2013/046002, Search completed Nov. 13, 2013, Mailed Nov. 29, 2013, 7 pgs.
International Search Report and Written Opinion for International Application No. PCT/US2013/056065, Search Completed Nov. 25, 2013, Mailed Nov. 26, 2013, 8 pgs.

(56) References Cited

OTHER PUBLICATIONS

International Search Report and Written Opinion for International Application No. PCT/US2013/059991, Search Completed Feb. 6, 2014, Mailed Feb. 26, 2014, 8 pgs.
International Search Report and Written Opinion for International Application No. PCT/US2009/044687, date completed Jan. 5, 2010, date mailed Jan. 13, 2010, 9 pgs.
International Search Report and Written Opinion for International Application No. PCT/US2011/064921, Report Completed Feb. 25, 2011, mailed Mar. 6, 2012, 17 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/027146, completed Apr. 2, 2013, 12 pgs.
International Search Report and Written Opinion for International Application No. PCT/US2013/039155, Search completed Jul. 1, 2013, Mailed Jul. 11, 2013, 11 Pgs.
International Search Report and Written Opinion for International Application No. PCT/US2013/048772, Search Completed Oct. 21, 2013, Mailed Nov. 8, 2013, 11 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, International Filing Date Nov. 13, 2013, Search Completed Mar. 14, 2014, Mailed Apr. 14, 2014, 12 pgs.
International Search Report and Written Opinion for International Application No. PCT/US11/036349, mailed Aug. 22, 2011, 11 pgs.
International Search Report and Written Opinion for International Application No. PCT/US2013/062720, report completed Mar. 25, 2014, Mailed Apr. 21, 2014, 9 Pgs.
International Search Report and Written Opinion for International Application No. PCT/US2014/024903 report completed Jun. 12, 2014, Mailed Jun. 27, 2014, 13 pgs.
International Search Report and Written Opinion for International Application No. PCT/US2014/017766, report completed May 28, 2014, Mailed Jun. 18, 2014, 9 Pgs.
International Search Report and Written Opinion for International Application No. PCT/US2014/018084, Report completed May 23, 2014, Mailed Jun. 10, 2014, 12 pgs.
International Search Report and Written Opinion for International Application No. PCT/US2014/018116, report completed May 13, 2014, Mailed Jun. 2, 2014, 12 Pgs.
International Search Report and Written Opinion for International Application No. PCT/US2014/022118, report completed Jun. 9, 2014, Mailed Jun. 25, 2014, 5 pgs.
International Search Report and Written Opinion for International Application No. PCT/US2014/024407, report completed Jun. 11, 2014, Mailed Jul. 8, 2014, 9 Pgs.
International Search Report and Written Opinion for International Application No. PCT/US2014/025100, report completed Jul. 7, 2014, Mailed Aug. 7, 2014, 5 Pgs.
International Search Report and Written Opinion for International Application No. PCT/US2014/025904 report completed Jun. 10, 2014, Mailed Jul. 10, 2014, 6 Pgs.
International Search Report and Written Opinion for International Application No. PCT/US2010/057661, completed Mar. 9, 2011, 14 pgs.
International Search Report and Written Opinion for International Application No. PCT/US2012/044014, completed Oct. 12, 2012, 15 pgs.
International Search Report and Written Opinion for International Application No. PCT/US2012/056151, completed Nov. 14, 2012, 10 pgs.
International Search Report and Written Opinion for International Application No. PCT/US2012/059813, Report completed Dec. 17, 2012, 8 pgs.
International Search Report and Written Opinion for International Application No. PCT/US2012/37670, Mailed Jul. 18, 2012, Report Completed Jul. 5, 2012, 9 pgs.
International Search Report and Written Opinion for International Application No. PCT/US2012/058093, Report completed Nov. 15, 2012, 12 pgs.
International Search Report and Written Opinion for International Application No. PCT/US2014/022123, report completed Jun. 9, 2014, Mailed Jun. 25, 2014, 5 pgs.
International Search Report and Written Opinion for International Application No. PCT/US2014/024947, Report Completed Jul. 8, 2014, Mailed Aug. 5, 2014, 8 Pgs.
International Search Report and Written Opinion for International Application No. PCT/US2014/028447, report completed Jun. 30, 2014, Mailed Jul. 21, 2014, 8 Pgs.
International Search Report and Written Opinion for International Application No. PCT/US2014/030692, report completed Jul. 28, 2014, Mailed Aug 27, 2014, 7 Pages.
International Search Report and Written Opinion for International Application No. PCT/US2014/023762, Report Completed May 30, 2014, Mailed Jul. 3, 2014, 6 Pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, vol. 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. vol. 3459, 9 pgs.
Borman et al., "Simultaneous Multi-Frame Map Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.

(56) References Cited

OTHER PUBLICATIONS

Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download-?doi=1 0.1.1.226.2643&rep=rep1 &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Chen et al., "KNN Matting", IEEE Transactions on Pattern Analysis and Machine Intelligence, Sep. 2013, vol. 35, No. 9, pp. 2175-2188.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 10, 2012). Retrieved from the Internet at http://www.site.uottawa.ca/-edubois/theses/Fanaswala_thesis.pdf, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer, et al., "Optical System Design", 2nd Edition, SPIE Press, pp. 191-198.
Fischer, et al., "Optical System Design", 2nd Edition, SPIE Press, pp. 49-58.
Goldman et al.,, "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", On Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi, et al., "Synthetic Aperture Tracking: Tracking Through Occlusions", ICCV IEEE 11th International Conference on Computer Vision; Publication [online]. Oct. 2007 Retrieved from the Internet: <URL: http:l/ieeexplore.ieee.org/stamp/stamp.jsp?tp=&arnumber=44090328,isnumber=4408819>; retrieved on Jul. 28, 2014. pp. 1-8.
Kang et al., "Handling Occlusions inn Dense Multi-View Stereo", Computer Vision and Pattern Recognition, 2001, vol. 1, pp. 1-103-1-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lai et al., "A Large-Scale Hierarchical Multi-View RGB-D Object Dataset", source and date unknown, 8 pgs.
Lensvector, "How LensVector Autofocus Works", printed Nov. 2, 2012, from http://www.lensvector.com/overview.html, 1 pg.

(56) References Cited

OTHER PUBLICATIONS

Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nguyen, Ha T. et al., "Image-Based Rendering with Depth Information Using the Propagation Algorithm", Nguyen et al., Image-Based Rendering With Depth Information Using The Propagation Algorithm, 2005, IEEE, ICASSP, pp. 1-4.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, 15 pgs.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander, et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pp. 115-129.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, Sep., 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park-Observational Astronomy (ASTR 310), Oct. 19, 2006, Retrieved from the Internet <URL: http://www.astro.umd.edu/~veilleux/ASTR310/fall06/ccd_theory.pdf, retrieved on May 13, 2014. 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 4 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.

(56) References Cited

OTHER PUBLICATIONS

Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
International Search Report and Written Opinion for International Application No. PCT/US2015/032467, Search completed Jul. 27, 2015, Mailed Aug. 19, 2015, 10 Pgs.
International Preliminary Report on Patentability for International Application PCT/US2015/032467, Report issued Nov. 29, 2016, Mailed Dec. 8, 2016, 9 Pgs.

\* cited by examiner

ARRAY CAMERAS INCLUDING AN ARRAY CAMERA MODULE AUGMENTED WITH A SEPARATE CAMERA

CROSS-REFERENCE TO RELATED APPLICATIONS

The current application is a Continuation-In-Part Application of U.S. patent application Ser. No. 14/216,968, entitled "Systems and Methods for Stereo Imaging With Camera Arrays" in the name of Venkataraman et al. filed Mar. 17, 2014 published as U.S. Patent Publication 2014/0267633 that claims priority to U.S. Provisional Application No. 61/798,673, filed Mar. 15, 2013 and claims priority to U.S. Provisional Application 62/003,015 filed May 26, 2014 entitled "Array Camera Augmented with External Image Senor (Cyclops)" in the name of Venkataraman et al. The disclosures of these applications are hereby incorporated herein by reference in their entirety.

FIELD OF THE INVENTION

The present invention relates to array cameras and particularly to array cameras including an array camera module with a separate camera.

BACKGROUND

An array camera includes a plurality of individual cameras (i.e., cameras) that can capture images of a scene where the image obtained by each camera is from a slightly different viewpoint. The individual images from each of the cameras are used to generate a single image having a higher resolution than the resolution of each of the individual cameras in the array. The use of an array camera to generate real-time video can be problematic because of the high computational load involved in synthesizing a single frame of video from the individual images captured by the cameras in the frame every frame interval. This is especially true in a mobile device where high computational load can require a large amount of processing time and/or expend a significant amount of power. For example, an array camera may include 16 individual cameras in the area, where each camera includes 1000×750 pixels. A common output for video data is either 720p (1280×720 pixels) or 1080p (1920×1080 pixels). However, the resolution of the individual cameras (1000×750 pixels) is lower than either of these desired output resolutions. As such, the video images derived from the array camera must undergo a cropping process to convert to a 16:9 format (960×540 pixels) and correspondence (parallax) estimation process to determine a correspondence between the images and a super-resolution processing process (2×) to output video in the desired format. Each of these processes increases the power requirement on a mobile telephone over the existing solution of capturing video using a conventional camera. In a conventional camera, the video is captured in the desired resolution and may be processed using hardware in the sensor. As such, the video from a conventional camera is likely to require less of a computational load and draw less power than an array camera.

SUMMARY OF THE INVENTION

The above and other problems are solved and an advance in the art is made by array cameras including an array camera module augmented with a separate camera in accordance with some embodiments of this invention. In accordance with some embodiments of the invention, an array camera includes an array camera module, a separate camera, a processor and memory storing software for directing the processor. The array camera module includes multiple cameras that capture images of a scene from different viewpoints. The separate camera is located a fixed baseline distance from the array camera module and captures an image of the scene from a different viewpoint to the viewpoints of the cameras in the array camera module. The processor reads the software from the memory.

The software directs the processor to perform in the following manner. A set of images captured from different viewpoints is obtained using the cameras in the array camera module and the separate camera. The images in the set of images are captured from different viewpoints. A reference viewpoint relative to the viewpoints of the set of images captured from different viewpoints is selected. Depth estimates for pixel locations in an image from the reference viewpoint are determined using the images in the set of images captured by the array camera module.

The depth estimate for a given pixel location in the image from the reference may be determined in the following manner. Pixels in the images captured by the array camera module that correspond to the given pixel location in the image from the reference viewpoint based upon expected disparity at a different depths are identified. The similarity of the corresponding pixels identified at each of the plurality of depths are compared and the depth is selected from the different depths at which the identified corresponding pixels have the highest degree of similarity as a depth estimate for the given pixel location in the image from the reference viewpoint.

The software further directs the processor to generate a depth map for an image in the set of images captured by the separate camera using the depth estimates for pixel locations in an image from the reference viewpoint in the following manner. The pixels in an image captured by the separate camera corresponding to pixels in the image from the reference viewpoint for which depth estimates were determined using images in the set of images captured by the cameras in the array camera module identified and depth estimates determined using images in the set of images captured by the array camera module to the corresponding pixels in the image captured by the separate camera are applied.

In accordance with some embodiments, the array camera module and the separate camera are set farther apart than the cameras in the array camera module. In accordance with many embodiments, the array camera module and the separate camera are located a fixed baseline distance apart.

In accordance with some embodiments, the cameras in the array camera module and the separate camera have the same resolution. In accordance with some embodiments, the separate camera has a higher resolution than the cameras in the array camera module. In accordance with many embodiments, the separate camera and the cameras in the array camera module capture image data in multiple color channels. In various embodiments, the separate camera is a Bayer camera and the array camera module includes cameras selected from the group consisting of Bayer cameras, and monochrome cameras.

In accordance with some embodiments, the baseline distance between the array camera module and the separate camera is variable. In many embodiments, the array camera includes internal sensors including gyroscopes and accelerometers and the software further directs the processor to estimate the baseline distance between the array camera module and the separate camera from extrinsics determined from matching features in the images captured by the array camera module and the separate cameras in combination with information from the gyroscopes and accelerometers.

In accordance with some embodiments, the array camera module forms an M×N array of cameras.

In accordance with many embodiments, the software further directs the processor to operate in the following manner. The processor determines whether a depth estimate for pixel locations in an image from the reference viewpoint determined using the images in the set of images captured by the array camera module corresponds to an observed disparity below a predetermined threshold. When the depth estimate corresponds to an observed disparity below the predetermined threshold, the depth estimate is refined using at least one image in the set of images captured by the separate camera. In accordance with a number of embodiments, the software further directs the processor to refine a depth estimate using images in the set of images captured by the separate cameras in the following manner. Pixels in images captured by the array camera module and by the separate camera that correspond to the given pixel location in the image from the reference viewpoint based upon expected disparity at different depths are identified. The similarity of the corresponding pixels identified at each of the plurality of depths is compared. The depth from the different depths at which the identified corresponding pixels have the highest degree of similarity as a depth estimate for the given pixel location in the image from the reference viewpoint is selected. In accordance with several embodiments, the software directs the processor to refine a depth estimate using images in the set of images captured by the array camera module and the separate camera by selecting the different depths based upon the depth estimate initially determined using the images in the set of images captured by the array camera module.

In accordance with some embodiments, the software further directs the processor to generate a depth map using the depth estimates for pixel locations in an image from the reference viewpoint, where the depth map indicates distances of surfaces of scene objects from the reference viewpoint. In accordance with many embodiments, the software further directs the processor to generate a depth map by identifying pixels in an image captured by the array camera module and the separate camera corresponding to pixels for which depth estimates were determined using images in the set of images captured by the array camera module and applying depth estimates determined using images from the set of images captured by the array camera module to the corresponding pixels.

In accordance with some embodiments, the software further directs the processor to synthesize a higher resolution image from the set of images captured by the array camera module using the depth map. In many embodiments, the software further directs the processor to synthesize a higher resolution image from the set of images captured by the array camera module and the separate cameras using the depth map. In accordance with a number of embodiments, the cameras in the array camera module form a π filter group. In accordance with several of these embodiments, the separate camera is a Bayer camera.

In accordance with some embodiments, an array camera includes an array camera module comprising multiple cameras that capture images of a scene from different viewpoints, a separate camera located a fixed baseline distance from the array camera module, where the separate camera captures an image of the scene from a different viewpoint to the viewpoints of the cameras in the array camera module, a processor and memory in communication with the processor storing software. The software directs the processor to operate in the following manner. An instruction to capture one of a still image and video images is received. Image data is synthesized using image data captured by the multiple cameras in the array camera module in response to an instruction to capture a still image. Video images are captured using image data from the separate camera in response to an instruction to capture video images.

DETAILED DISCLOSURE OF THE INVENTION

Figure 1:
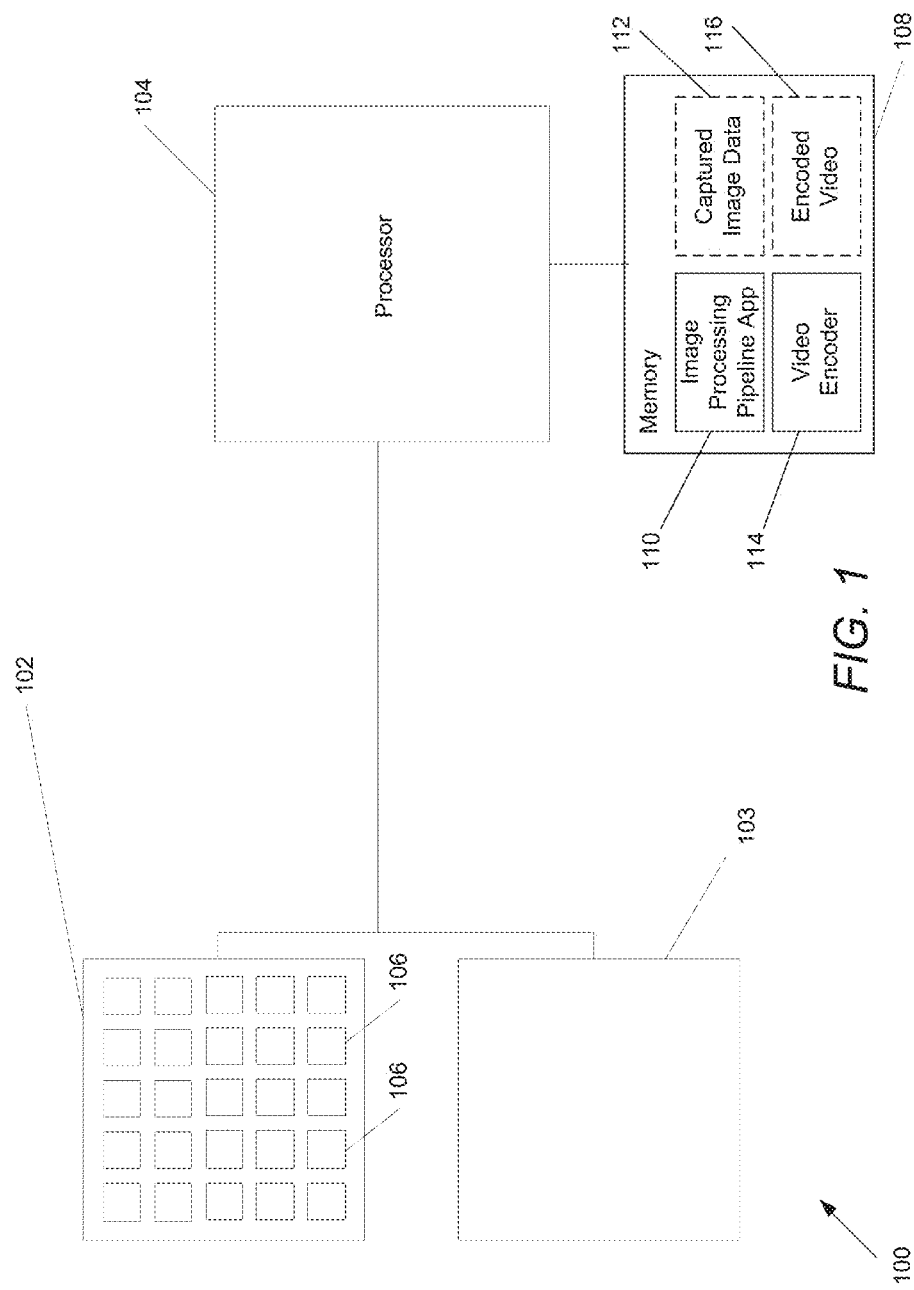
FIG. 1 is a conceptual illustration of a camera architecture including an array camera and a conventional camera in accordance with embodiments of the invention.

Turning now to the drawings, array cameras including an array camera module augmented with a separate camera in accordance with various embodiments of this invention are disclosed. In accordance with some embodiments of this invention, the array camera includes an array camera module positioned a known distance from a conventional camera. The term conventional camera is referred herein to describe a camera implemented using a single sensor and associated optics including a single aperture that forms a single image of a scene on the sensor, where the capture of image data by the sensor and read out of image data from the sensor can be directly performed by an external device. In several embodiments, the conventional camera has a sufficiently high resolution to capture video sequences according to the requirements of specific video capture applications. Array camera modules included in array cameras in accordance with embodiments of the invention can be utilized to capture image data from different viewpoints as disclosed in U.S. Patent Publication No. 2011/0069189, entitled "Capturing and Processing of Images using Monolithic Camera Array with Heterogeneous Images", to Venkataraman et al., the relevant disclosure from which is incorporated by reference herein in its entirety. As disclosed in U.S. Patent Publication No. 2011/0069189, an array camera typically contains two or more cameras that capture image data from multiple viewpoints that can be used in depth estimation and super-resolution processing. The combination of an array camera module and a separate camera where the resolution of the cameras in the array camera module and the resolution of the separate camera can be considered a special case of the class of non-grid array cameras disclosed in U.S. Patent Publication No. 2011/0069189. Array cameras in accordance with various embodiments of this invention utilize the presence of different types of cameras in a non-grid array camera to vary the cameras and/or image data captured based upon the requirements of specific applications. In this way, the power efficiency of video capture using a single camera can be harnessed in combination with the ability to estimate depth and perform super-resolution processing afforded by capturing image data from different viewpoints.

In accordance with some embodiments of the invention, the conventional camera is used to capture video images when video is desired and the array camera module is used to capture still images when still images are required. In accordance with many embodiments, the conventional camera may be used to provide preview images for use in capturing still images with the cameras in the array camera module. In accordance with a number of embodiments, the preview images are modified to indicate the scene that may be captured using the array camera module. In a number of embodiments, the image capture parameters for the conventional camera is detected while preview images are captured and the image capture parameters from the conventional camera is used to adjust the image capture parameters for the cameras in the array camera module.

In accordance with some embodiments, the conventional camera and the cameras in the array camera module capture still images when a still image is desired. The image data from the conventional camera and the cameras in the array camera module may then be used to generation depth information in accordance with many of embodiments. In a number of embodiments, the depth information includes a depth map for the image. In accordance with several of these embodiments, the still image is generated from the image data captured by the conventional camera. In accordance with still other embodiments, the still image is generated from image data captured by the cameras in the array camera module.

In accordance with some embodiments, the conventional camera and the cameras in the array camera module capture video images when video images are desired. The video image data from the conventional camera and the cameras in the array camera module may then be used to generation depth information for the images in accordance with many of embodiments. In a number of embodiments, the depth information includes a depth map for the video images. In accordance with several of these embodiments, the video image is generated from the video image data captured by the conventional camera. In accordance with still other embodiments, the video image is generated from image data captured by the cameras in the array camera module.

In accordance with some embodiments of the invention, the conventional camera and/or the array camera module are activated to capture image data based upon a desired task to be performed. In many embodiments, the array camera module is activated when depth-enabled features are activated and a conventional camera is activated when variable resolution features are activated. Array cameras including an array camera module and a separate camera in accordance with various embodiments of the invention are discussed below.

Array Camera Architecture

An array camera architecture that can be used in a variety of array camera configurations in accordance with embodiments of the invention is illustrated in FIG. 1. The array camera system 100 includes an array camera module 102 and a conventional camera 103 that are spaced a known distance apart. Both the array camera module 102 and the conventional camera 103 are connected to a processor 104. Cameras 106 in the array camera module 102 are evenly spaced in a 5×5 square. In other embodiments, cameras may have different spacing or can be arranged in other orientations in the array camera module.

The array camera module 102 is connected to the processor 106. The processor is also configured to communicate with one or more different types of memory 108 that can be utilized to store an image processing pipeline application 110, image data 112 captured by the array camera module 102, a video encoder 114 and encoded video 116. The image processing pipeline application 110 is typically non-transitory machine readable instructions utilized to direct the processor to perform processes including (but not limited to) the various processes described below.

Processors 108 in accordance with many embodiments of the invention can be implemented using a microprocessor, a coprocessor, an application specific integrated circuit and/or an appropriately configured field programmable gate array that is directed using appropriate software to control various operating parameters of the array camera module 102 and/or conventional camera 103. The processor 104 can also function to process the images captured by array camera module 102 to produce a synthesized higher resolution image using super-resolution processes, or transfer the images to other hardware, software, firmware or a combination thereof to process the images. The processor 104 may also process the images captured by conventional camera 103 to provide a final image or transfer the images to other hardware, software, firmware or a combination thereof to process the images. The array camera system 100 can also include memory 108 in communication with the processor 104 for storing images. In a variety of embodiments, the memory 108 includes circuitry such as, but not limited to, memory cells constructed using transistors, that are configured to store instructions. Similarly, the processor 104 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Array camera modules 102 in accordance with many embodiments of the invention can be constructed from an array camera module or sensor including an array of focal planes and an optic array including a lens stack for each focal plane in the array camera module. Sensors including multiple focal planes and the operation of such sensors are discussed in U.S. Patent Publication No. 2012/0013748 entitled "Architectures for System on Chip Array Cameras", to Pain et al., the relevant disclosure from which is incorporated herein by reference in its entirety. A sensor including a single array of pixels on which images are formed by the optics of each camera can also be utilized to capture image data. In several embodiments, each camera includes a separate sensor. In many embodiments, individual lens barrels are utilized to implement the optics of the camera. Array camera modules incorporating cameras implemented using combinations of separate sensors and optic arrays, separate sensors and separate lens barrels and a single sensor and separate lens barrels in accordance with embodiments of the invention are disclosed in U.S. patent application Ser. No. 14/536,537 entitled "Methods of Manufacturing Array Camera Modules Incorporating Independently Aligned Lens Stacks" to Rodda et al. filed Nov. 7, 2014, the relevant disclosure from which is incorporated by reference herein in its entirety. Light filters can be used within each optical channel formed by the optics of a camera in the array camera module to enable different cameras to capture image data with respect to different portions of the electromagnetic spectrum.

In accordance with some embodiments, conventional camera 103 has a wider field of view than array camera module 102 to account for the diverging viewpoints based upon the distance between conventional camera 103 and array camera module 102. In accordance with some embodiments, the cameras in array camera module 102 and the conventional camera 103 have fixed focus lengths so that the blurring profiles of the conventional camera 103 and the array camera module 102 are consistent and fixed over a wide range of scenes. The fixed focal lengths in the conventional camera 103 and the array camera module 102 can also enable the conventional camera 103 and the array camera module 102 to have similar depth of field profiles and reduce potential sources of differences during the image processing of image data captured by the cameras in the array camera module 102 and the conventional camera 103 in accordance with some embodiments.

In accordance with some embodiments, the conventional camera 103 and the array camera module 102 may be synchronized in terms of frame delivery and shutter speed. In accordance with many embodiments, the conventional camera 103 and the array camera module 102 are synchronized using linked clocks and signals indicating an image capture. In a number of embodiments, frame capture by the conventional camera 103 and the cameras in the array camera module 102 are synchronized so that frames from both cameras are captured synchronously and can be compared to each other during subsequent image processing.

In accordance with some embodiments, the individual cameras in array camera module 102 each capture images in a particular spectral channel including but not limited to Red, Green, and Blue. In accordance with a number of embodiments, the individual cameras in the array camera module 102 are Bayer cameras. In accordance with some embodiments, the conventional camera 103 is a Bayer camera. As can readily be appreciated, the specific cameras utilized in an array camera module and/or a separate conventional camera can be any of a variety of cameras that image any portion(s) of the spectral band appropriate to the requirements of a specific application.

In accordance with some embodiments, two or more array camera modules may be placed at known distances on various sides of conventional camera 103 so that each portion of the scene sampled by the conventional camera 103 is visible in at least one camera in the array camera module. Where the array camera module includes multiple types of camera that image different portions of the spectrum, then array cameras in accordance with many embodiments of the invention position the cameras in the array camera module so that one camera of each type views each portion of the scene sampled by the conventional camera. In accordance with various embodiments, the array camera module may be enhanced by synchronized gyroscopes, accelerometers, structured illumination and the like to further enhance the depth map and to keep array camera module 102 synchronous with the vertical sync of conventional camera 103.

Although a specific architecture is illustrated in FIG. 1, any of a variety of architectures including an M×N array of cameras that enables the capture of low resolution images and application of super-resolution processes to produce a synthesized high resolution image as well as a conventional camera a known distance from the array can be utilized in accordance with embodiments of the invention.

Image Capture Processes

Figure 2:
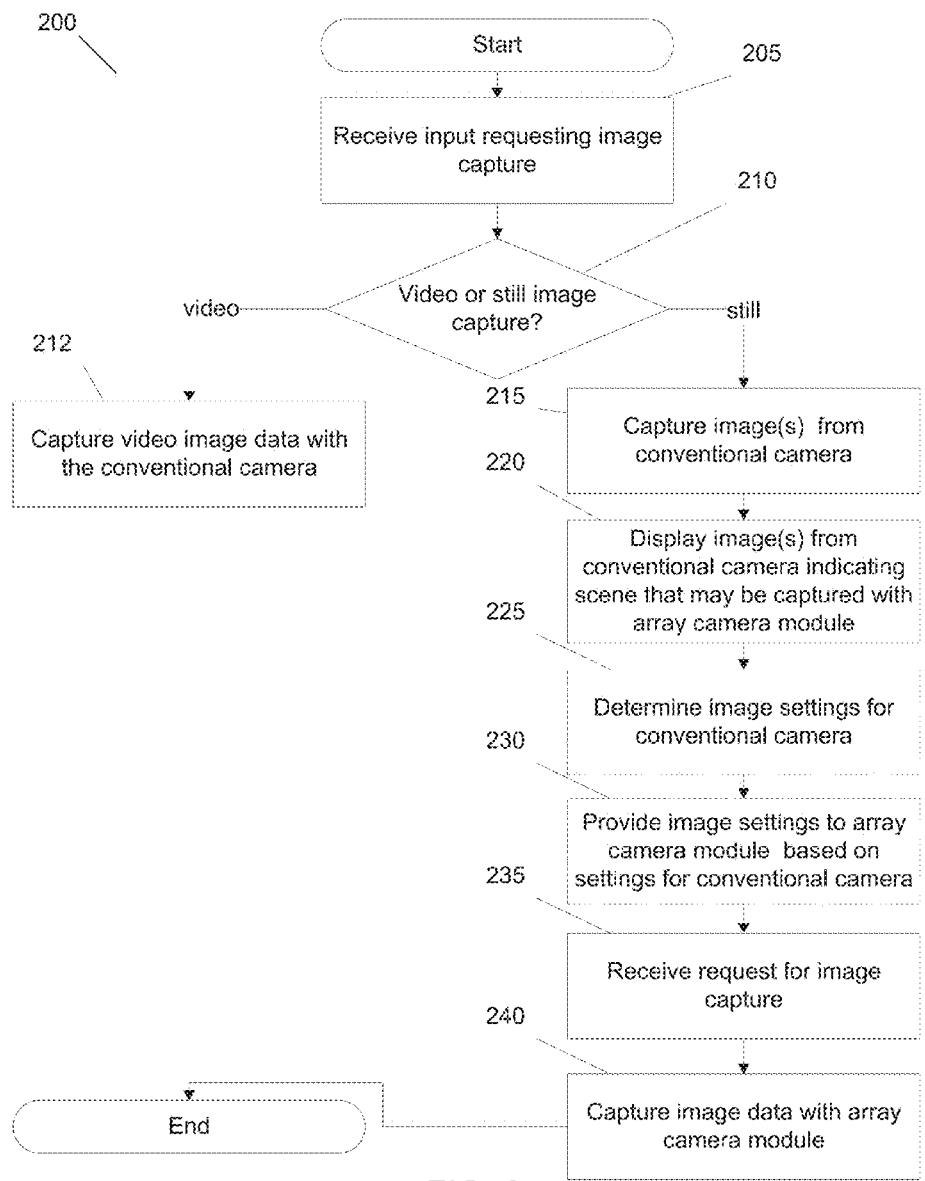
FIG. 2 is an illustration of a flow diagram of a process for capturing image data using an array camera and a conventional camera in accordance with an embodiment of the invention.

In accordance with some embodiments of the invention, a system with an array camera module augmented with a conventional camera captures video images using the convention image sensor and still images using the array camera module. A flow diagram of a process of capturing image data using either the array camera module or the conventional camera in accordance with an embodiment of this invention is shown in FIG. 2. In process 200, an input requesting an image capture function is received (205). In accordance with several embodiments, the request is a user input that indicates one of a number of image capture options including (but not limited to) video image capture, and still image capture. In accordance with some of these embodiments, the input is obtained via selection of an icon on a graphical user interface. In the illustrated embodiment, the process 200 determines (210) whether video images or still images are to be captured based upon the user input.

If video images are to be captured, the convention image sensor is activated to capture video image data in a conventional manner. If still images are to be captured, the process 200 can activate the conventional camera to capture preview images (215), display the preview images from the conventional camera (220), receive a request to capture a still image (235), and capture a still image using the array camera module (240).

The conventional camera may have a viewpoint that is different from the array camera module due to space between the conventional camera and the array camera module. To show the scene that may be captured by the array camera module, the conventional camera may have a larger field of view than the fields of view of the cameras in the array camera module. Furthermore, the field of view of the convention camera can include the fields of view of the cameras in the array camera module. In this way, the portion of the scene sampled (or that will be sampled) by the cameras in the array camera module can be determined.

The preview image(s) captured by the conventional camera are displayed to the user (225). In accordance with some embodiments the display includes an indication of the field of view of the array camera module. In many embodiments, the indication may be provided by cropping the preview image(s) to approximate the scene of the field of view of the array camera module. In accordance with a number of embodiments, the indication may be an outline of a box, crosshairs, or some other graphical element super-imposed over the displayed preview image(s). In several embodiments, a depth map for the scene is generated based upon image data generated by the array camera during preview mode and a perspective correction is applied to a portion of the field of view of the images captured by the conventional camera to shift the image into the viewpoint of the array camera.

In accordance with some embodiments, process 200 optionally includes the determining of the image settings for the conventional camera (230) and the providing of image settings for the array camera module based upon the image settings of the sensor in the convention camera (235). In accordance with some embodiments, an auto-exposure loop of the conventional camera converges to a particular desired gain and exposure and/or other image settings for a scene being captured. In some embodiments, the image setting of the conventional camera is provided to the array camera module to adjust the image settings of the cameras in the array camera module. However, the array camera module may have different properties in terms of various image settings including (but not limited to) transmissivity, pixel sensitivity, available gain, and/or exposure range. Thus, a controller, circuit, or software process may convert the image settings of the conventional camera to terms for use in the array camera in accordance with many embodiments. In a number of embodiments, the conversion includes (but is not limited to) gain settings, exposure settings, color balance corrections and tone curve.

The array camera module is configured to capture an image of a scene that is indicated in the preview image(s). A request or snap is then detected (240) and the array camera module capture image data for the desired image. The image data may then be used to render an image using image processing techniques similar to those described the applications incorporated by reference above.

Although processes for capturing image data using either the array camera module or the conventional camera are described above with reference to FIG. 2, one skilled in the art will recognize that other processes for capturing image data using either a conventional camera or an array camera module may be performed as appropriate to the requirements of specific applications in accordance with various embodiments of this invention.

Figure 3:
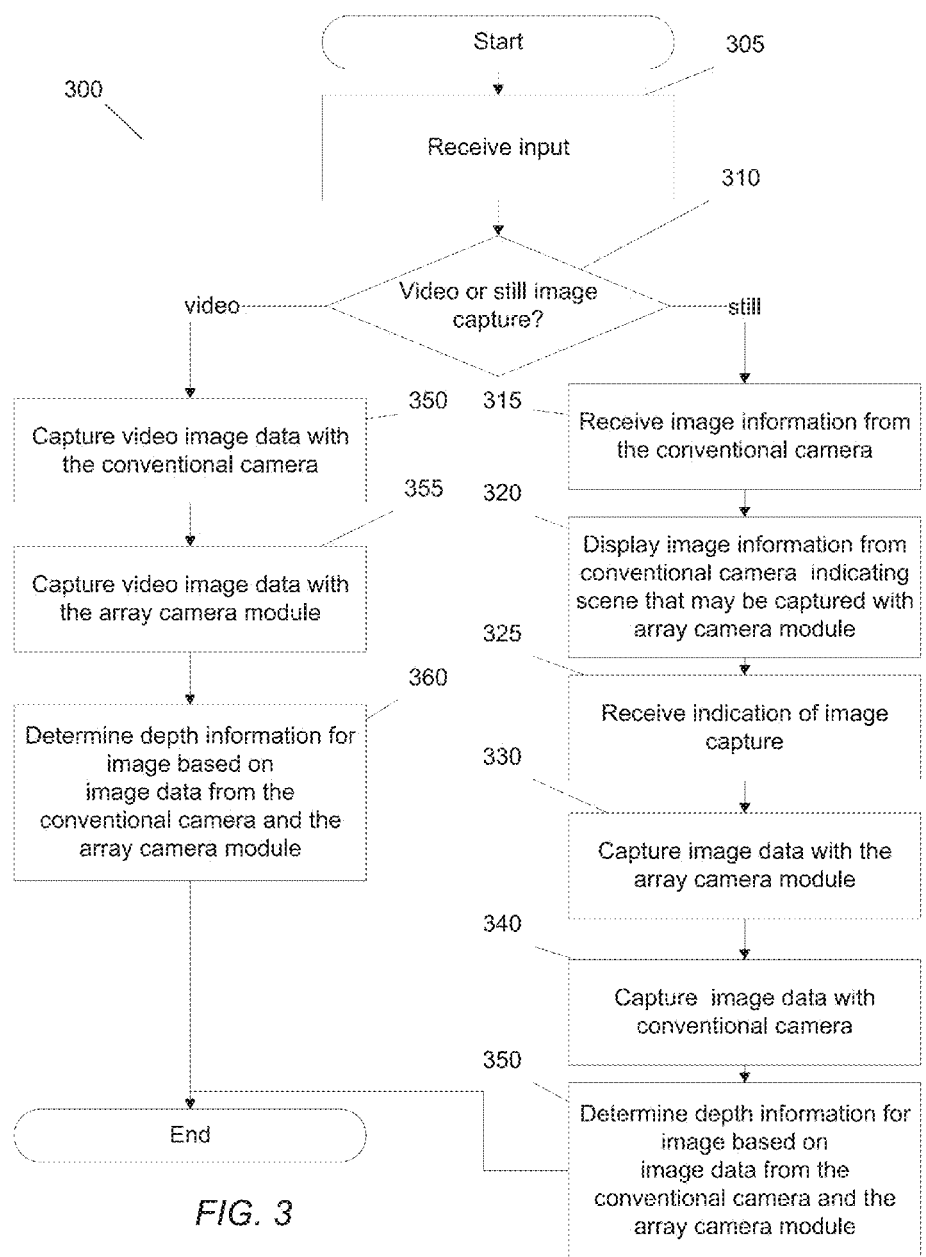
FIG. 3 is an illustration of a flow diagram of a process for capturing image data using an array camera and a conventional camera in accordance with another embodiment of the invention.

In accordance with some embodiments, the conventional camera may be leveraged to improve depth accuracy in image processing of images from the array camera module for still images. Likewise, array camera module may be used to improve depth accuracy in video data obtained using the convention image sensor. In particular, the conventional camera can implement both the still and video mode in some embodiments. In these embodiments, the array camera module is utilized as a depth sensor. The array camera module captures lower resolution and/or lower quality stills that contain depth enabled features including, but not limited to, matting and segmentation. A process for using the conventional camera and/or array camera module to improve depth accuracy for image processing in accordance with an embodiment of this invention is shown in FIG. 3. In process 300, an input requesting an image capture function is received (305). In accordance with some embodiments, the request is an input by user that can indicate that video image capture or still image capture is requested. In accordance with some of these embodiments, the input is a selection of an icon on a graphical user interface. The process 300 determines whether video images or still images are to be captured (310).

In accordance with some embodiments, the capturing of the preview image(s) involves capturing video image data using the conventional camera (315). The conventional camera may have a viewpoint that is different from the array camera module due to space between the conventional camera and the array camera module. To show the scene that may be captured by the array camera module, the conventional camera may have a larger field of view than the fields of view of the cameras in the array camera module. Furthermore, the field of view of the convention camera can include the fields of view of the cameras in the array camera module. In this way, the portion of the scene sampled (or that will be sampled) by the cameras in the array camera module can be determined.

The preview image(s) captured by the conventional camera are displayed to the user (320). In some embodiments, the display may also provide an indication of depth and the preview may only show the portion of the field of view of the conventional camera for which depth information is available from image data captured by the cameras in the array camera module.

An indication to capture an image is received (325). In some embodiments, the indication may be an input by a user. In accordance with many embodiments, the indication may be a signal received by another process using the array camera to capture an image. Image data is captured by the cameras in the array camera module (330) and the conventional camera (340) In accordance with some embodiments and the capture of the image data is synchronized to occur over a common image capture time interval. In accordance with some embodiments, the determination of image setting information discussed with respect to process 200 above may be performed prior to image capture with the array camera.

Depth information can be determined using image data captured by the cameras in the array camera module and conventional camera (350). In accordance with some embodiments, disparity searches along epipolar lines can be performed to identify correspondences between pixels in images captured by one or more cameras in the array camera module and pixels in the image from the conventional camera. These disparity searches can be utilized in combination with information concerning the baseline between the various cameras to perform depth estimation. The determined depth estimates can improve depth estimates determined with only image data from the cameras in the array camera module, because depth error typically increases quadratically as the baseline (distance between the cameras capturing the compared images) gets smaller. Thus, depth estimation error can be reduced in array cameras in which the baseline (distance) between the conventional camera and one or more cameras in the array camera module is larger than the baseline between the cameras in the array camera module.

In accordance with some embodiments, the individual cameras in the array camera module capture an individual spectral channel. In these embodiments, the image data captured by a camera in the array camera module within a specific spectral channel may be compared against image data captured by other cameras from within the array camera module that capture image data within the same spectral channel and/or image data captured by the conventional camera in the same spectral channel. For example, a red pixel in image data captured by a camera in the array camera module can be compared to the red channel of the image data from the conventional camera. In accordance with a number of embodiments, the individual cameras in the array camera module are Bayer cameras (capturing Red (R), Green (G), and Blue (B) spectral channels).

In accordance with some embodiments, the process may determine whether to determine the depth information only using image data from the cameras in the array camera module when the objects at very near distances because the small baselines between cameras reduces the disparity range that needs to be searched. However, the image data from the conventional camera and one or more cameras from the array camera module are used when the objects are at far distances to provide better measurements of disparity.

In many embodiments, the conventional camera may have different physical characteristics from the individual cameras within the array camera module. As such, normalizations are enacted to reduce the apparent dissimilarity between the raw image data captured by the conventional camera and the individual cameras from the array camera module to enable the correspondence searches. The normalizations may include, but are not limited to, measurement and correction of differential or absolute distortion between images captured by the conventional camera and images captured by the individual cameras in the array camera module prior to the correspondence search; measurement and correction of different photometric properties of the respective lenses in the cameras from the array camera module and/or the conventional camera; measurement and correction of different spectral properties or color biases in the respective lenses or pixels and color filters involved in the different cameras; measurement and correction or normalization of blur differences between different lenses (for example, in one embodiment blurring images from both the array camera module and the conventional camera to a common lower resolution, or blurring whichever image is captured at a higher resolution to match the frequency response of the other camera as much as possible); and measurement and correction of varying fields of view between the conventional camera and cameras in array camera module. In accordance with a number of embodiments, the images captured at a higher resolution will be appropriately filtered and downsampled to match both the pixel count and blur of the lower resolution images so that the similarity of corresponding pixels can be determined. Additionally, in some embodiments, differential responses (e.g. noise characteristics, pixel sensitivities, etc.) of pixels in the respective cameras may be characterized in order to normalize the responses prior to correspondence search.

A more complete discussion of processes for determining depth information is provided below with respect to FIGS. 5-10.

Turning back to process 300, if it is determined that video images are to be captured (310), video image data is captured with the conventional camera (350) and the array camera module (355). The video image data from the conventional camera and the array camera module are then used to generate depth information for the frames in the video sequence (360) using techniques similar to those discussed above with respect to still images.

Although specific processes for using a conventional camera and/or an array camera module to improve depth estimation accuracy during image and/or video capture are discussed above with reference to FIG. 3, other processes can be performed using one or more conventional cameras and/or an array camera module to obtain depth estimates during image and/or depth capture as appropriate to the requirements of specific applications in accordance with other embodiments of this invention.

In accordance with some embodiments, the user may be provided an option to activate the array camera module for particular desired tasks. For example, the user may be provided a choice in the camera application that allows them to indicate a desire to capture a refocusable image for a particular image. In this scenario, during the capture of the image, the array camera module is activated and image data captured by the cameras in the array camera module is at least used for depth estimation and/or synthesis of an image in accordance with some embodiments. In many embodiments, the user may be provided an option to maximize resolution, but perhaps at the expense of depth-enabled features. In such a scenario the conventional camera captures the still image provided the physical characteristics of the conventional camera enable the sensor to provide at least as high a resolution output as the array camera module. In accordance with many embodiments, the live still preview perspective is selected to match the camera selected for the particular mode of capture. For example, if the user selected a 'refocusable' image, the array camera module might activate a preview capability of the array camera module for the sake of framing the scene in order to ensure that the viewpoint of the still preview reflects as closely as possible the viewpoint of the eventual captured image.

In accordance with a number of embodiments, a real-time video and/or depth mode in the array camera module may be activated upon the request of a user or application. The real-time video and/or depth mods may provide different resolutions and/or frame rates than the video mode provided by the conventional camera but could be used to additional capabilities such as augmented reality. In such a case, a higher level process in a software library or performed by a controller may manage which of the conventional camera and/or array camera is active depending on high-level options provided to users.

Figure 4:
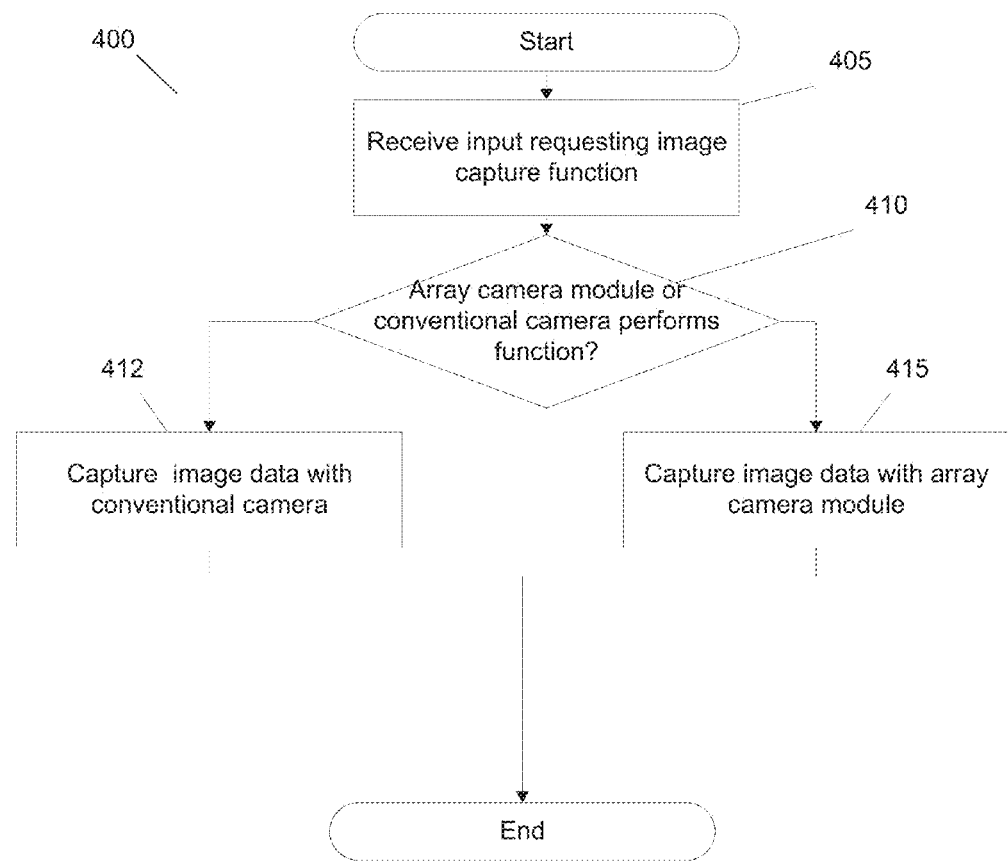
FIG. 4 is an illustration of a flow diagram of a process for capturing image data using an array camera and a conventional camera in accordance with yet another embodiment of the invention.

A process for activating either the conventional camera and/or the array camera module depending on the function being performed in accordance with an embodiment of the invention is shown in FIG. 4. In process 400, a request for an image capture function is received (405). Based on the image capture function requested, the process determines which one or both of the conventional camera and the array camera module to activate (410). If the conventional camera is needed, image data is captured with the conventional camera (412). If the array camera module is needed, image data is captured with the array camera module (415).

Although an embodiment of a process for activating one of either the conventional camera and/or the array camera module based on the image capture function to be performed is described above, other processes for activating one of either the conventional camera and/or the array camera module based on the image capture function to be performed may be utilized in accordance with other embodiments of this invention.

Depth Measurement Processes

In many embodiments of the invention, a conventional camera and an array camera module are mounted a fixed distance apart and form a pair of stereo array cameras. In many embodiments, the distance between the array camera module and conventional camera is known with reference to one or more locations on the array. In addition, the locations of each camera within array camera module are known. Therefore, the baseline (distance between any two cameras) between any camera in the array camera module and conventional camera is known or can be determined.

Distance Measurement Using an Array Camera Module and Conventional Camera

Images of a scene captured by different cameras in an array camera have differences due to the different points of view resulting from the different locations of the cameras, an effect known as parallax. These differences, referred to as disparity, provide information that can be used to measure depth of objects within a scene. Systems and methods for detecting disparity and calculating depth maps for an image are discussed in U.S. Pat. No. 8,619,082 entitled "Systems and Methods for Parallax Detection and Correction in Images Captured Using Array Cameras" to Venkataraman et al., filed Aug. 21, 2012, the disclosure of which is incorporated by reference herein in its entirety.

Figure 5:
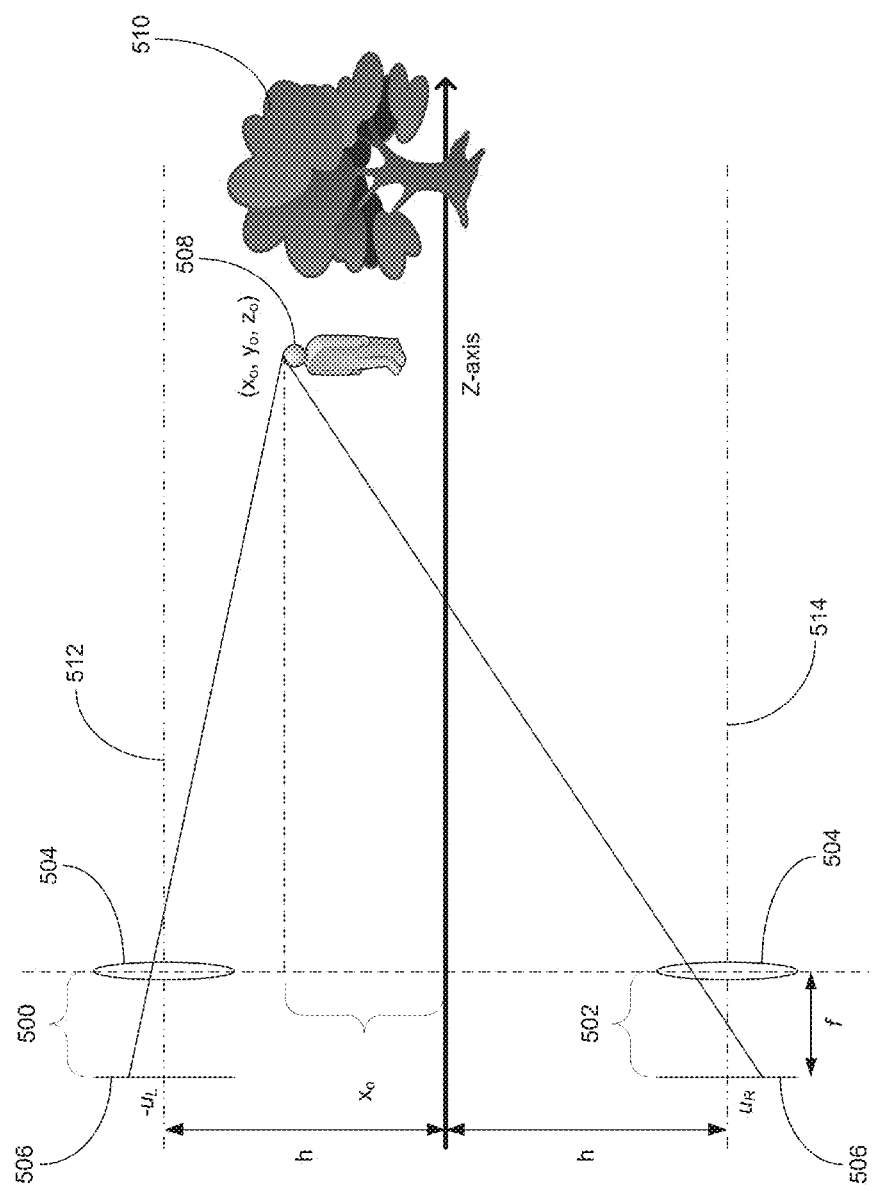
FIG. 5 is an illustration of parallax effects on the images captured in a two camera system.

Parallax in a two camera system is illustrated in FIG. 5. The two cameras 500, 502, include a lens stack 504 and a focal plane 506. Each camera has a back focal length f, and the two cameras are separated by the baseline distance of 2 h. The field of view of both cameras encompasses a scene including a foreground object 508 and a background object 510. The disparity introduced by the different fields of view of the two cameras 500, 502, is equal to the difference in location of the foreground object 508 between its location in the image captured by the first camera (represented as an offset of the point on the focal plane of the first camera 500 relative to its optical axis 512 shown as $-u_L$) and its location in the image captured by the separate cameras (represented as an offset of the point on the focal plane of the separate cameras 502 relative to its optical axis 514 is shown as $u_R$).

U.S. Pat. No. 8,619,082 incorporated above discusses depth measurement using the following relationship between disparity and depth with respect to FIG. 5:

$$\Delta_{parallax} = u_R - u_L = \frac{2hf}{z_o} \quad (1)$$

From the above equation and figure, it can be seen that disparity between images captured by the different cameras is along a vector in the direction of the baseline of the two cameras, which can be referred to as the epipolar line between the two cameras. Furthermore, the magnitude of the disparity is directly proportional to the baseline separation of the two cameras and the back focal length of the cameras and is inversely proportional to the distance from the camera to an object appearing in the scene. The distance (or depth) from the two cameras to the foreground object can be obtained by determining the disparity of the foreground object in the two captured images.

One method of determining depth of a pixel or object using images captured by an array camera module involves selecting an initial hypothesized depth or distance for a selected pixel from an image captured from a reference viewpoint/camera, and searching pixel locations in other images along the epipolar line between the reference viewpoint/camera and the camera capturing each of the other images for similar/matching pixels. This process is discussed in the patent incorporated by reference above, and can be modified to utilize an array camera module and conventional camera set farther apart than the cameras in a single array camera module to determine depth to a higher precision as will be discussed further below.

Techniques such as those disclosed in the patent application incorporated above are typically used to generate a depth map from a reference viewpoint. The reference viewpoint can be from the viewpoint of one of the cameras in an array camera module. Alternatively, the reference viewpoint can be an arbitrary virtual viewpoint. A depth map indicates the distance of the surfaces of scene objects from a reference viewpoint. Although a process for calculating depth using disparity is discussed above, any of a variety of techniques for calculating depth can be utilized in accordance with embodiments of the invention. Processes for depth measurement using a stereo system including an array camera module and a conventional camera are discussed below.

Figure 6:
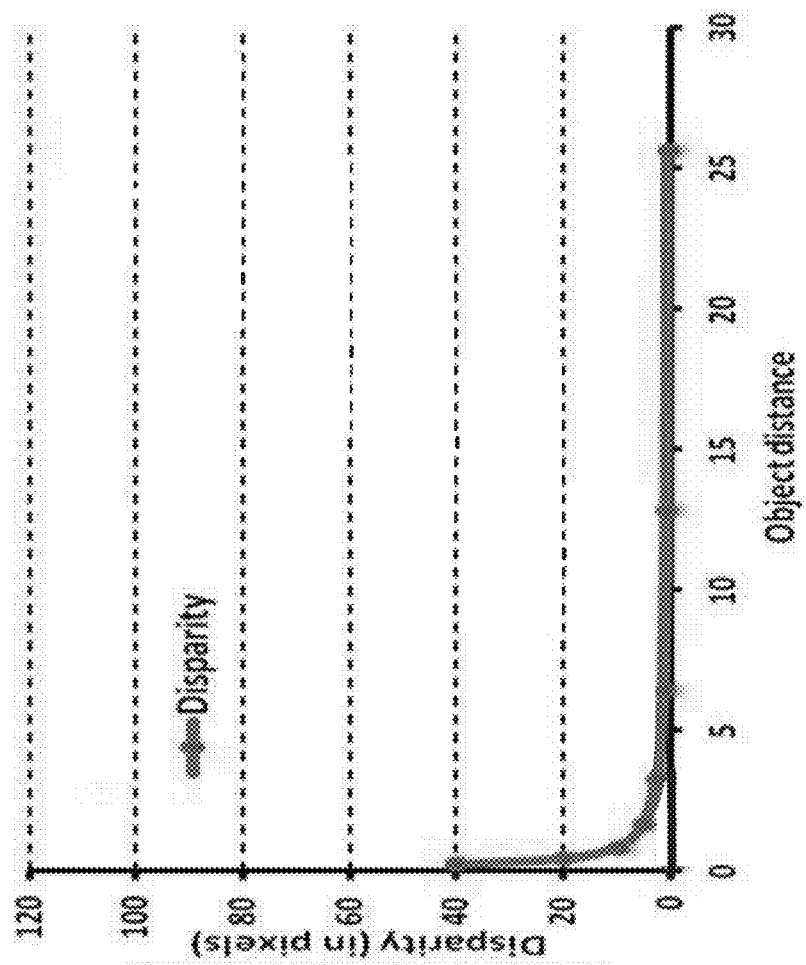
FIG. 6 is a graph illustrating object distance versus observed disparity.
Figure 7:
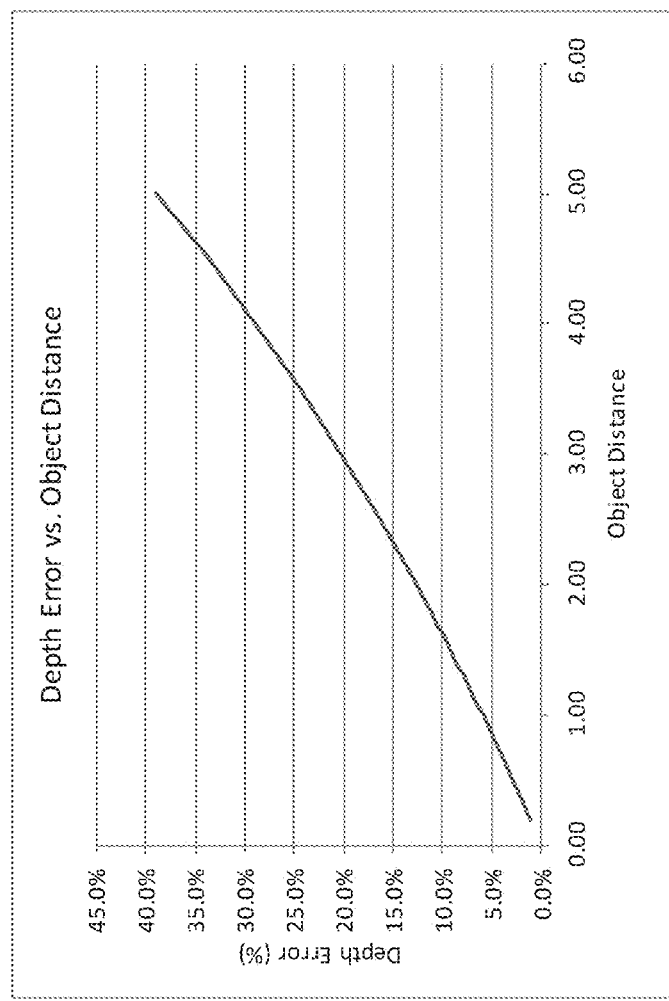
FIG. 7 is a graph illustrating object distance versus depth error.

Enhanced Distance Measurement Using a Stereo System Including an Array Camera Module and a Conventional Camera The closer that an object is to an array camera module, the larger the disparity that will be observed in the object's location in different images captured by different cameras in the array. A representative graph of object distance with observed disparity is illustrated in FIG. 6. It can be seen in the graph that as the object distance approaches zero (i.e., comes closer to the camera), the disparity increases dramatically. Conversely, as the object distance increases, the disparity decreases. It can also be seen that the rate of change in disparity decreases as object distance increases. A representative graph of object distance with depth error is illustrated in FIG. 7. The graph assumes a 4×4 array camera module where the baseline between any two adjacent cameras is 2.3 mm, the pixel size is 1.75 µm, and the focal length is about 2 mm. The depth error is calculated as the percentage of depth resolution over object distance, where depth resolution indicates the resolution of the depth (the distance by which two objects should be separated for the array camera module to distinguish between the objects as two separate depths) at a given object distance. It can be seen that depth error increases with object distance.

The further a camera is from the reference viewpoint, the larger the disparity that will be observed. Typically larger shifts enable depth to be determined with greater precision. Increasing the baseline (distance between cameras) increases the observed disparity accordingly. Therefore, using a camera that captures an image from a reference viewpoint and the cameras that are further away from that camera to determine depth information can improve precision.

Figure 8:
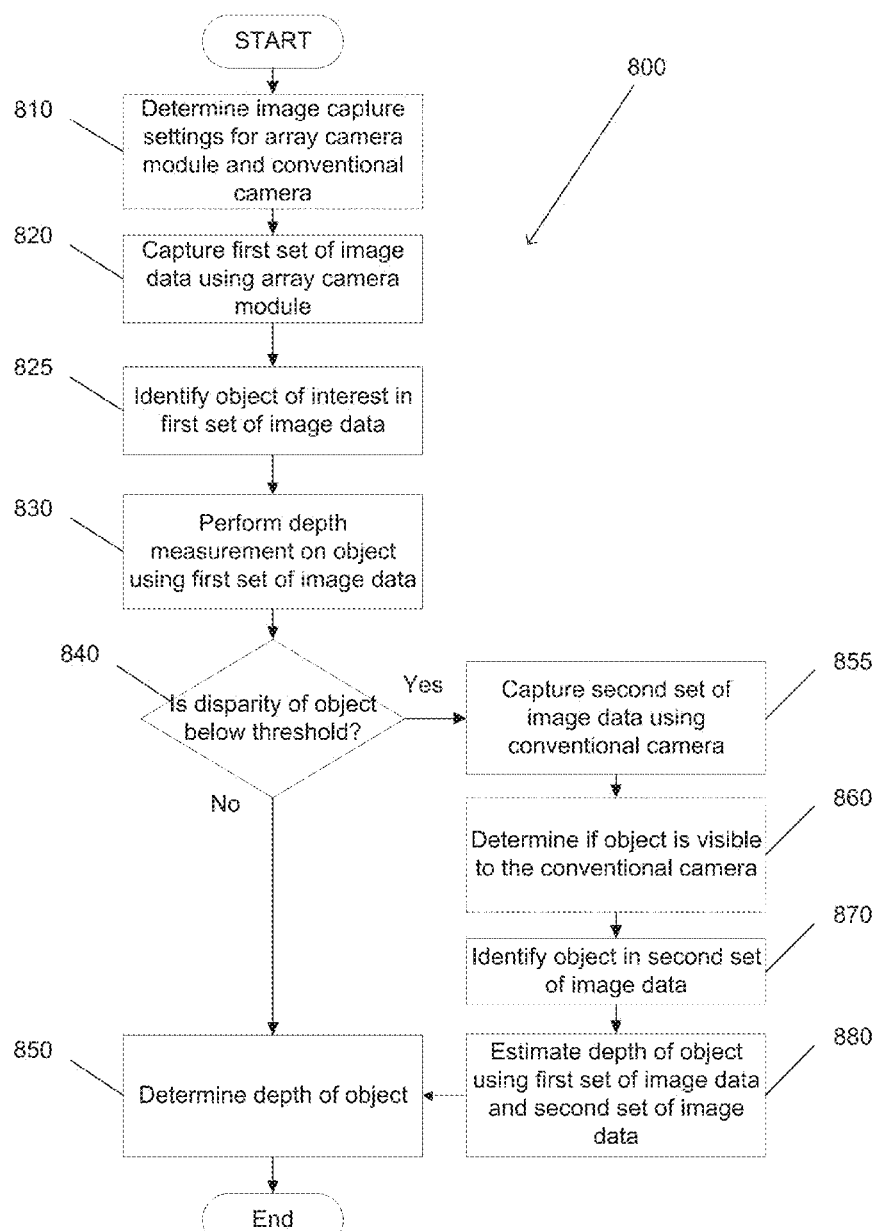
FIG. 8 is an illustration of a flow diagram of a process for measuring depth using an array camera and a conventional camera in accordance with an embodiment of the invention.

In many embodiments of the invention, an array camera module and a conventional camera are set apart at a known distance in a stereo camera configuration and image data from the array camera module and the conventional camera are used to generate depth information for an object observed. A process for measuring depth using a stereo system including an array camera module and a conventional camera in accordance with embodiments of the invention is illustrated in FIG. 8. The process 800 includes determining (810) image capture settings for the array camera module and the conventional camera. Image capture settings can include calibration for nonlinearities or nonconformities in the lenses (e.g., by incorporating scene-independent geometric shifts as appropriate).

A first set of image data is captured (820) using the array camera module. Typically, each individual camera collects image data that can be used to form an image from the point of view of the individual camera. In array camera modules, often one camera is designated a reference camera and the image data captured by that camera is referred to as being captured from a reference viewpoint. In many embodiments of the invention, image data that is captured includes image data from a reference camera. In several embodiments, the active cameras capturing the image data are configured with color filters or other mechanisms to limit the spectral band of light captured. The spectral band can be (but is not limited to) red, blue, green, infrared, or extended color. Extended color is a band that includes at least a portion of at the band of wavelengths of least two colors. Systems and methods for capturing and utilizing extended color are disclosed in U.S. Patent Application Nos. 61/798,602 and U.S. Patent Publication No. 2014/0267762, entitled "Extended Color Processing on Pelican Array Cameras" to Mullis et al., hereby incorporated by reference.

An object of interest is identified (825) in the first set of image data. The identification can be based upon a variety of techniques that include, but are not limited to: user input (e.g., selection on a screen), motion activation, shape recognition, and region(s) of interest. The identification can be made in an image generated from the first set of image data from the cameras in the array camera module. For example, the object of interest can be indicated in a preview image generated from the first set of image data or in a reference image from a reference viewpoint that corresponds to a reference camera in the array camera module. The identification can include selection of a pixel or set of pixels within the image associated with the object.

Using the first set of image data, a depth is determined (830) for the object. Techniques for determining the depth of the object can include those disclosed in U.S. Pat. No. 8,619,082 incorporated by reference and discussed further above. The effects of noise can be reduced by binning or averaging corresponding pixels across images captured by different cameras utilizing techniques such as, but not limited to, those disclosed in U.S. Patent Application Ser. No. 61/783,441, filed Mar. 14, 2013, entitled "Systems and Methods for Reducing Motion Blur in Images or Video in Ultra Low Light with Array Cameras" to Molina and P.C.T. Patent Publication No. WO 2014/159779, filed Mar. 12, 2014, entitled "Systems and Methods for Reducing Motion Blur in Images or Video in Ultra Low Light with Array Cameras" to Molina, the disclosures of which are hereby incorporated in their entirety. In several embodiments of the invention, intermediate images can be formed with pixel values in locations in each image where the pixel values are binned or averaged from corresponding pixels in different images. The intermediate images, which have noise components "averaged out" can then be used in depth calculation.

If the disparity of the object is above a predetermined threshold (440), i.e. is within a predetermined distance from the array camera module, the depth calculated above (830) is accepted as the depth of the object (850). A confidence measure can be given that is based on factors such as lens calibration and/or pixel resolution (the width that a pixel represents based on distance from the camera). The confidence measure can also incorporate information from a confidence map that indicates the reliability of depth measurements for specific pixels as disclosed in U.S. Pat. No. 8,619,082 incorporated by reference above.

If the disparity of the object is below the predetermined threshold (840), then the depth measurement of the object can be refined using a second set of image data from the conventional camera. As discussed further above, a longer baseline between a camera in the array camera module and the conventional camera can provide increased precision, because of increased disparity, when estimating depth to objects further away from the array camera.

A second set of image data is captured (855) using the conventional camera. The object of interest is identified (870) in the second set of image data based upon a variety of techniques that can include those discussed above with respect to identifying the object in the first set of image data or other tracking techniques known in the art. If the system does not assume that the object of interest is visible to the conventional camera, the process can first determine (860) if the object is visible to at least one camera in the second array. Visibility can be determined, for example, by searching for similar pixels as discussed with respect to FIG. 9 in U.S. Pat. No. 8,619,082 incorporated by reference above.

A depth measurement is performed (880) on the object using at least a portion of the first set of image data and at least a portion of the second set of image data. The measurement can include determining the disparity between pixel(s) associated with the object of interest in images captured by one or more cameras in the array camera module and corresponding pixel(s) in the image(s) captured by the conventional camera.

Although specific processes are described above for obtaining depth measurements using multiple array cameras, any of a variety of combinations of two or more array cameras can be utilized to obtain depth measurements based upon the disparity observed between image data captured by cameras within the two array cameras can be utilized as appropriate to specific applications in accordance with embodiments of the invention.

A stereo array configuration can be formed in an ad hoc manner using one array camera and changing the position of the array camera module. In many embodiments of the invention, an ad hoc stereo array camera module includes an array camera module capturing an image of a scene in one position, moving the array camera module to a second position, and capturing a second image with the array camera module in the second position. The two sets of images captured in this way can form an ad hoc stereo pair of sets of images. By correlating the features from the two sets of images with each other and internal sensors such as a gyroscope and/or accelerometer in combination with the matched features, the camera extrinsics (such as camera center of projection and camera viewing direction) can be determined. In several embodiments, additional image data can be captured by a conventional camera to provide a combination of stereo image capture and ad hoc stereo.

Unified Parallax Computation

A stereo system provides additional optimization possibilities in computing parallax disparities as compared to a single array camera. Parallax calculations can be performed using processes such as those disclosed in U.S. Pat. No. 8,619,082 incorporated by reference above. As discussed above with respect to certain embodiments of the invention, parallax calculations can be performed to compute depths using the cameras in an array camera module. In many embodiments, information calculated using the array camera module can be used to accelerate calculation of depths with the conventional camera. For example, in many processes for calculating depth, images are sampled for similar pixels to determine disparity as discussed in U.S. Pat. No. 8,619,082. When pixels and/or objects have a depth that was already calculated by an array camera module, the search for similar pixels in the image captured by the conventional camera can use the depth information for the same pixel/object as a starting point and/or to limit the search to the "expected" portions of the image as predicted by the existing depth information. In several embodiments, the pixel/object can be correspondingly identified in images captured by the second array such that the existing depths can be applied to the proper pixel/object, even when the corresponding pixel/object is not in the same location within the image(s). In many embodiments, correspondence of pixels/objects is not necessarily determined for part or all of an image, but the depths of each pixel in the first image are used for calculating the depth of the pixel in the same location in the second image.

Figure 9:
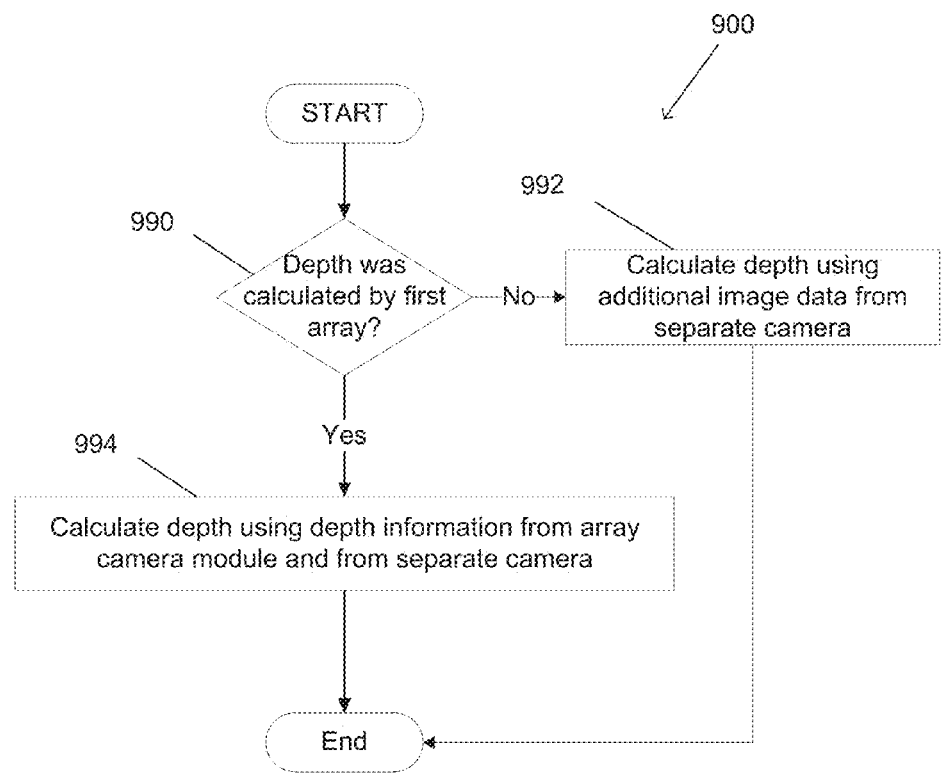
FIG. 9 is an illustration of a process for reusing depth information in accordance with embodiments of the invention.

A process for reusing depth information in accordance with embodiments of the invention is illustrated in FIG. 9.

The process 900 includes determining (990) if depth was calculated for a pixel using the array camera module. If depth was not calculated, a depth is calculated (992) for the pixel using image data from the array camera module and image data captured by the conventional camera. If depth was estimated for the pixel, a depth is estimated (994) using image data image data from the array camera module and image data captured by the conventional camera taking into consideration the depth information from the array camera module, such as by limiting and/or refining the search for similar pixels as discussed above.

High Resolution Image Synthesis

The image data in low resolution images captured by an array camera module can be used to synthesize a high resolution image using super-resolution processes such as those described in U.S. patent application Ser. No. 12/967,807 entitled "Systems and Methods for Synthesizing High Resolution Images Using Super-Resolution Processes" to Lelescu et al. The disclosure of U.S. Patent Publication No. 2012-0147205 is hereby incorporated by reference in its entirety. A super-resolution (SR) process can be utilized to synthesize a higher resolution (HR) 2D image or a stereo pair of higher resolution 2D images from the lower resolution (LR) images captured by an array camera module. The terms high or higher resolution (HR) and low or lower resolution (LR) are used here in a relative sense and not to indicate the specific resolutions of the images captured by the array camera.

A stereo array camera configuration can also be used to create a HR image by using the cameras from both arrays. While the relatively large baseline between the array camera module and the conventional camera would result in relatively larger occlusion zones (where parallax effects block some content that is captured in one camera from being captured in another camera), in other visible areas from the array camera module and the conventional camera would enhance the final achieved solution. Preferably, each of the array camera module and the conventional camera is complete in its spectral sampling. In several embodiments, the array camera module utilizes a it color filter pattern so that the image that is synthesized using the cameras in array camera module is devoid of parallax artifacts in occlusion zones. In several embodiments, color filters in individual cameras can be used to pattern the cameras in the array camera module with π filter groups as further discussed in U.S. Provisional Patent Application No. 61/641,165 entitled "Camera Modules Patterned with pi Filter Groups", to Nisenzon et al. filed May 1, 2012, the disclosure of which is incorporated by reference herein in its entirety.

High resolution (HR) images can be used to enhance depth measurement using an array camera module and a conventional camera in processes such as those described further above. In several embodiments of the invention, HR images are generated from image data captured by the array camera module and/or the conventional camera. Each HR image can be generated using images captured by cameras in the array or images captured by the array camera module and the conventional camera. The HR images can then be used as image data in processes for generating depth measurement such as those described above. Measurement can be more robust using HR images because it is typically less sensitive to noise. Creating high resolution depth maps in accordance with embodiments of the invention is discussed below.

High Resolution Depth Map

The image data captured by a stereo system can be used to generate a high resolution depth map whose accuracy is determined by the baseline separation between the array camera module and the conventional camera rather than the baselines of the individual cameras within the array camera module. Depth maps can be generated by any of a variety of processes including those disclosed in U.S. Pat. No. 8,619,082 incorporated by reference above. As discussed further above, the accuracy of depth measurement by an array camera module is reduced at further distances from the array. By using images captured by the cameras in the array camera module in a stereo configuration with one or more images captured by the conventional camera, the baseline between the two cameras is significantly increased over the baseline between two cameras in a single array. Accordingly, depth estimation precision with respect to objects observed at distances from the array camera can be increased relative depth estimates made with images captured by the array camera module alone.

Speed Measurement Using Array Cameras

Motion of an object across the field of view of a digital camera can generally be translated into an angular measurement (or angular velocity with elapsed time information) if the pixel size and back focal length are known, within the tolerance of one pixel and the corresponding angular measure of one pixel. At any given distance d from the camera, the angular measure of one pixel uniquely corresponds to a linear measure. Therefore, given a starting and ending location of an object in two dimensional images captured by a digital camera and the starting and ending distance of the object from the camera, the relative starting and ending locations of the object can be determined in three dimensional space. Provided the time elapsed between the images, the speed (or velocity) of the object can also be calculated. Given one start location and one end location, this can be represented as a linear velocity. Given multiple locations over time, the distance between each pair of consecutive locations (i.e. segment) can be determined and the distances of the segments combined to give a total distance. Additionally, a total average speed can be found by dividing the total distance over the time elapsed or by averaging the speed in each segment (distance divided by time elapsed in that segment) over the total time elapsed.

Conventional digital cameras typically capture two dimensional images without the capability of depth/distance measurement and are thus limited to angular measurement of motion. As discussed further above, array camera modules can be used to determine depth by observing the disparity between multiple images that are captured by different cameras in the array. Formulas and techniques for determining distance relative to pixel disparity as in U.S. Pat. No. 8,619,082 incorporated by reference above can also be used to determine the linear measure that the width of one pixel corresponds to at a given distance from the camera. In addition, one can calculate the time elapsed between the starting and ending frames simply by counting the number of frames between them and observing the frame rate of video capture of the camera.

Figure 10:
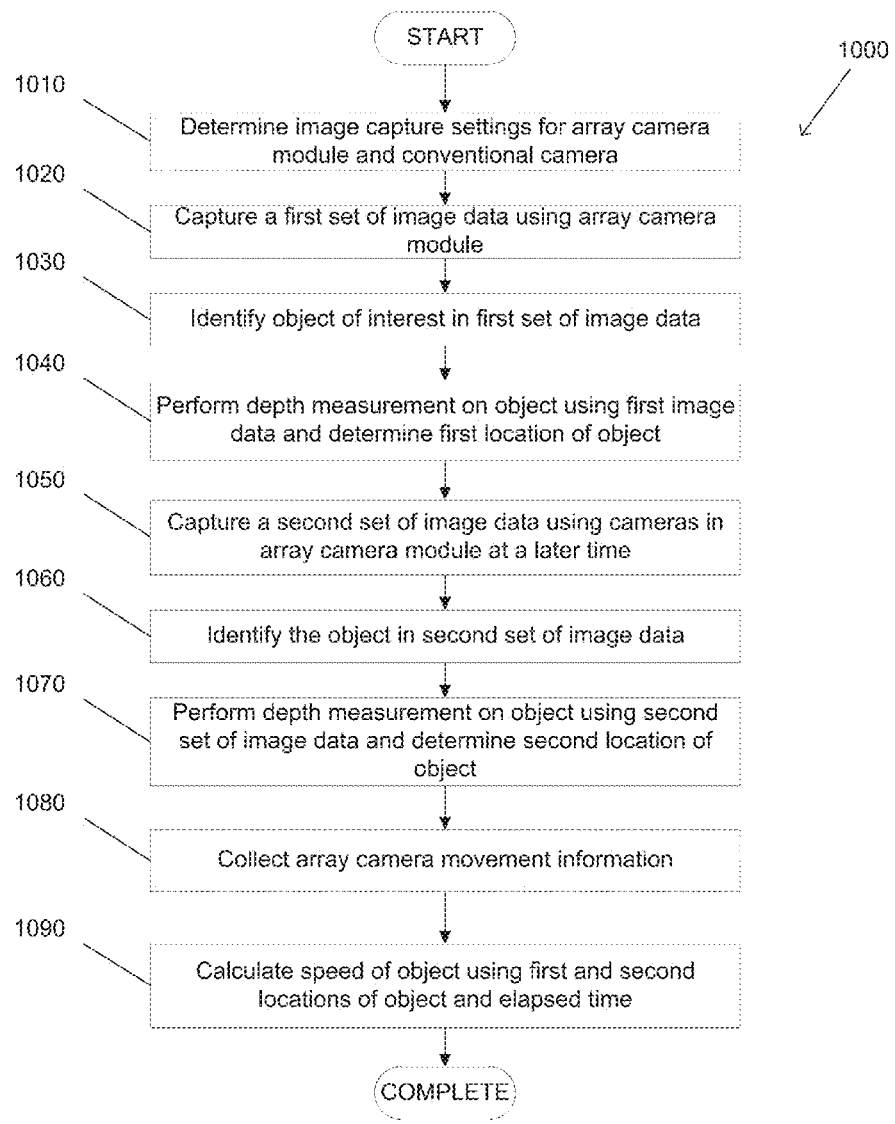
FIG. 10 illustrates a process for measuring speed using an array camera and a conventional camera in accordance with embodiments of the invention.

In many embodiments of the invention, depth information for an object is combined with an angular measure of the object's position to provide a three-dimensional location for the object. In various embodiments of the invention, depth can be calculated using an array camera module and a conventional camera in a stereo configuration as discussed further above. The three-dimension location of an object in two or more images can be used to calculate a speed and direction of the object. A process for measuring speed using an array camera in accordance with embodiments of the invention is illustrated in FIG. 10. The process 1000 includes determining (1010) image capture settings for active cameras in an array camera module and the conventional camera. Image capture settings can include calibration for non-linearities or nonconformities in the lenses (e.g., by incorporating scene-independent geometric shifts as appropriate). For example, due to physical characteristics of a lens stack, a pixel that is closer to the center line of a camera may differ in the area of a scene captured by the pixel from a pixel that is farther from the center line.

A first set of image data is captured (1020) using active cameras in the array camera module. Typically, each camera collects image data that can be used to form an image from the point of view of the camera. In array camera modules, often one camera is designated a reference camera and the image data captured by that camera is referred to as being captured from a reference viewpoint. In many embodiments of the invention, depth measurements are made with respect to the viewpoint of the reference camera using at least one other camera (alternate view cameras) within the array.

An object of interest is identified (1030) in the first set of image data. The identification can be based upon a variety of techniques that include, but are not limited to: user input (e.g., selection on a screen), motion activation, shape recognition, and region(s) of interest. The identification can be made in an image generated from the first set of image data from the cameras in the array camera module. For example, the object of interest can be indicated in a preview image generated from the first set of image data or in a reference image from a reference viewpoint that corresponds to a reference camera in the first array. The identification can include selection of a pixel or set of pixels within the image associated with the object.

Using the first set of image data, a first depth measure and a first location are determined (1040) for the object. Techniques for determining the depth of the object can include those disclosed in U.S. Pat. No. 8,619,082 incorporated by reference and discussed further above. Depth can be calculated using image data captured by the array camera module and/or conventional camera in a stereo configuration as discussed further above. Using the two-dimensional location of the object in an image (e.g., a reference image) an angular measure can be determined for the location of the object with respect to the camera. Combining the angular measure with the depth measure gives a three-dimensional location of the object with respect to the array camera. Any of a variety of coordinate systems can be utilized in accordance with embodiments of the invention to represent the calculated location of the object. In several embodiments of the invention, the centerline of a camera is treated as the origin.

At some time t after the capture of the first set of image data, a second set of image data is captured (1050) using the cameras in the array camera module. In many embodiments of the invention, the same set of cameras utilized to capture the first set of image data are used to capture the second set of image data. In other embodiments, a second set with a different combination of cameras is used to capture the second set of image data.

The object of interest is identified (1060) in the second set of image data. Identification can be based upon a variety of techniques that can include those discussed above with respect to identifying the object in the first set of image data or other tracking techniques known in the art.

Using the second set of image data, a second depth measure and a second location are determined for the object (1070). Depth can be calculated using techniques discussed further above using a single array camera module; or an array camera module and a conventional camera in a stereo configuration. Location can be calculated using techniques discussed further above and can incorporate known information about the location of the conventional camera in relation to the array camera module (e.g., removing parallax effects).

In different scenarios, an array camera module used to capture sets of image data for speed measurement may be stationary (e.g., tripod mounted) or may be in motion (e.g., handheld or panning across a scene). It can also include an array camera module using multiple image captures from slightly different points of view to get the advantage of a larger baseline and a more accurate depth. In several embodiments of the invention, an array camera module is assumed to be stationary and need not compensate for motion of the array. In other embodiments of the invention, an array camera module includes sensors that collect camera motion information (1080) on up to six degrees of movement of the camera, including motion along and rotation about three perpendicular axes. These sensors can include, but are not limited to, inertial sensors and MEMS gyroscopes. Camera motion information that is collected can be used to incorporate motion compensation when calculating the speed and/or direction of an object of interest (i.e., using the camera as a frame of reference). Motion compensation may be appropriate for functions such as stabilization (when there is jitter from slight movements of the camera such as by hand movement) or tracking an object (panning the camera to keep a moving object within the camera's field of view). In further embodiments of the invention, an array camera module is configurable to switch between an assumption that it is stationary (no motion compensation) and that it is moving or moveable (apply motion compensation).

The speed of the object of interest is calculated (1090) using the first location and second location of the object. The direction can also be calculated from the location information, as well as a vector representing the speed and direction of the object.

A confidence measure can be given that is based on factors such as lens calibration and/or pixel resolution (the width that a pixel represents based on distance from the camera). The confidence measure can also incorporate information from a confidence map that indicates the reliability of depth measurements for specific pixels as disclosed in U.S. Pat. No. 8,619,082 incorporated by reference above.

Additionally, calculating speed in accordance with embodiments of the invention can involve calculating a refined depth measurement using an array camera module and a conventional camera as discussed further above with respect to FIG. 4 or two separate image captures with the same array camera module. The technique of using two different image captures of the same scene with the same array camera module can also be extended to conventional cameras, wherein the conventional camera captures two images from different points of view, and depth and other measurements can be obtained through cross correlation of the images. In further embodiments of the invention, super-resolution processes can be utilized to perform measurements of angular position relative to the reference viewpoint at a higher precision. The super-resolution processes synthesize higher resolution images and the pixels in the synthesized higher resolution image enable measurement of the location of an object relative to an origin point within the image with higher precision. Accordingly, synthesizing a time sequence of higher resolution images using super-resolution processes can facilitate higher precision velocity measurements than measurements obtained using the lower resolution image data captured by the reference camera. Although a specific process for calculating speed is discussed above with respect to FIG. 10, any of a variety of processes for calculating speed can be utilized in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation, without departing from the scope and spirit of the present invention. Thus, embodiments of the present invention should be considered in all respects as illustrative and not restrictive.

What is claimed is:

1. An array camera, comprising:
an array camera module comprising a plurality of cameras that capture images of a scene from different viewpoints;
a single camera, where the single camera captures an image of the scene from a different viewpoint to the viewpoints of the cameras in the array camera module;
a processor; and
memory in communication with the processor;
wherein software stored in the memory that when read by the processor directs the processor to:
obtain a first set of images captured from different viewpoints using the cameras in the array camera module and a second set of images captured using the single camera, where the images in the first set of images and the images in the second set of images are captured from different viewpoints;
select a reference viewpoint relative to the viewpoints of the first set of images captured from different viewpoints using the array camera module;
determine depth estimates for pixel locations in an image from the reference viewpoint using the images in the first set of images captured by the array camera module, wherein generating a depth estimate for a given pixel location in the image from the reference viewpoint comprises:
identifying corresponding pixels in each of at least two images from different view points the first set of images captured by the array camera module that correspond to the given pixel location in the image from the reference viewpoint based upon expected disparity at a plurality of depths;
comparing the similarity of the corresponding pixels from the at least two images from the first set of images identified at each of the plurality of depths; and
selecting a depth from the plurality of depths at which the identified corresponding pixels have the highest degree of similarity as the depth estimate for the given pixel location in the image from the reference viewpoint; and
generate a depth map for an image in the second set of images captured by the single camera using the depth estimates for pixel locations in the image from the reference viewpoint by:
identifying pixels in the image from the second set of images captured by the single camera corresponding to pixels in the image from the reference viewpoint for which the depth estimates were determined using images in the first set of images captured by the cameras in the array camera module; and
applying the depth estimates determined using the images in the first set of images captured by the array camera module to the corresponding pixels in the image from the second set of images captured by the single camera.

2. The array camera of claim 1, wherein the array camera module and the single camera are set farther apart than the cameras in the array camera module.

3. The array camera of claim 2, wherein the array camera module and the single camera are located a fixed baseline distance apart.

4. The array camera of claim 1, wherein the cameras in the array camera module and the single camera have the same resolution.

5. The array camera of claim 1, wherein the single camera has a higher resolution than the cameras in the array camera module.

6. The array camera of claim 1, wherein the single camera and the cameras in the array camera module capture image data in multiple color channels.

7. The array camera of claim 1, wherein the single camera is a Bayer camera and the array camera module comprises cameras selected from the group consisting of Bayer cameras, and monochrome cameras.

8. The array camera of claim 1, wherein a baseline distance between the array camera module and the single camera is variable.

9. The array camera of claim 8, further comprising:
internal sensors including gyroscopes and accelerometers; and
software further directs the processor to estimate the baseline distance between the array camera module and the single camera from extrinsics determined from matching features in the images from the first set of images captured by the array camera module and the images from the second set of images captured by the single camera in combination with information from the gyroscopes and accelerometers.

10. The array camera of claim 1, wherein the array camera module forms an M×N array of cameras.

11. The array camera of claim 1, wherein software further directs the processor to:
determine whether a depth estimate for a pixel location in the image from the reference viewpoint determined using the images in the first set of images captured by the array camera module corresponds to an observed disparity below a predetermined threshold; and
when the depth estimate corresponds to an observed disparity below the predetermined threshold, refining the depth estimate using at least one image in the second set of images captured by the single camera.

12. The array camera of claim 11, wherein software further directs the processor to refine a depth estimate using images in the second set of images captured by the single camera by:
identifying pixels in images from the first set of images captured by the array camera module and images from the second set of images captured by the single camera that correspond to the given pixel location in the image from the reference viewpoint based upon expected disparity at a plurality of depths;
comparing the similarity of the corresponding pixels identified at each of the plurality of depths; and
selecting a depth from the plurality of depths at which the identified corresponding pixels have the highest degree of similarity as the depth estimate for the given pixel location in the image from the reference viewpoint.

13. The array camera of claim 12, wherein software further directs the processor to refine a depth estimate using images in the first set of images captured by the array camera module and images from the second set of images captured by the single camera by selecting the plurality of depths based upon the depth estimate initially determined using the images in the first set of images captured by the array camera module.

14. The array camera of claim 1, wherein software further directs the processor to generate a depth map for the image from the reference viewpoint using the depth estimates for pixel locations in the image from the reference viewpoint, where the depth map indicates distances of surfaces of scene objects from the reference viewpoint.

15. The array camera of claim 14, wherein software further directs the processor to generate a depth map for the image from the reference viewpoint by identifying pixels in an image from the first set of images captured by the array camera module and an image from the second set of images captured by the single camera corresponding to pixels for which depth estimates were determined using images in the first set of images captured by the array camera module and applying depth estimates determined using images from the first set of images captured by the array camera module to the corresponding pixels.

16. The array camera of claim 1, wherein software further directs the processor to synthesize an image from the first set of images captured by the array camera module having a resolution that is higher than a resolution of an image from the first set of images captured by the array camera using the depth map for the image from the reference viewpoint.

17. The array camera of claim 1, wherein software further directs the processor to synthesize an image from the first set of images captured by the array camera module and the second set of images from the single camera using the depth map for the image from the reference viewpoint.

18. The array camera of claim 1, wherein the cameras in the array camera module form a π filter group.

19. The array camera of claim 18, wherein the single camera is a Bayer camera.

* * * * *